(12) United States Patent
Ishizaki et al.

(10) Patent No.: US 12,341,275 B2
(45) Date of Patent: Jun. 24, 2025

(54) ELECTRONIC DEVICE AND ELECTRONIC COMPONENT

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Kiyokazu Ishizaki, Inagi Tokyo (JP); Masahide Takazawa, Yokohama Kanagawa (JP); Nobuhiro Yamamoto, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 414 days.

(21) Appl. No.: 17/939,885

(22) Filed: Sep. 7, 2022

(65) Prior Publication Data

US 2023/0282996 A1  Sep. 7, 2023

(30) Foreign Application Priority Data

Mar. 7, 2022  (JP) ................................. 2022-034178

(51) Int. Cl.
*H01R 12/58* (2011.01)
*G06F 3/06* (2006.01)
(Continued)

(52) U.S. Cl.
CPC ........... *H01R 12/58* (2013.01); *G11B 33/022* (2013.01); *G11B 33/122* (2013.01);
(Continued)

(58) Field of Classification Search
CPC ...... H01R 12/50; H01R 12/51; H01R 12/515; H01R 12/52; H01R 12/523; H01R 12/526;
(Continued)

(56) References Cited

U.S. PATENT DOCUMENTS 7,740,488 B2   6/2010   Taylor
9,118,152 B2   8/2015   Ho
(Continued)

FOREIGN PATENT DOCUMENTS

JP   H0158949 U    4/1989
JP   H02135766 A   5/1990
(Continued)

OTHER PUBLICATIONS

U.S. Appl. No. 17/686,696, First Named Inventor: Masahide Takazawa; Title: "Electronic Device"; filed Mar. 4, 2022.
(Continued)

*Primary Examiner* — Khiem M Nguyen
(74) *Attorney, Agent, or Firm* — Holtz, Holtz & Volek PC

(57) ABSTRACT

According to an embodiment, an electronic device includes a substrate and an electronic component. The substrate includes a first surface facing a first direction and to which a first hole and a second hole are open. The electronic component includes a base, a first protrusion in the first hole, and a second protrusion in the second hole. The first protrusion and the second protrusion protrude from the base. The first end of the first protrusion is more apart from the first surface than the second end of the second protrusion. The first protrusion and the second protrusion have a first inclined surface and a second inclined surface extending obliquely with respect to the first direction. In a third direction orthogonal to the first direction the first inclined surface is longer in length than the second inclined surface.

11 Claims, 11 Drawing Sheets

(51) Int. Cl.
   *G11B 33/02* (2006.01)
   *G11B 33/12* (2006.01)
   *H01R 12/72* (2011.01)

(52) U.S. Cl.
   CPC ......... *H01R 12/722* (2013.01); *G06F 3/0676* (2013.01); *G11B 2220/2516* (2013.01)

(58) Field of Classification Search
   CPC ...... H01R 12/55; H01R 12/58; H01R 12/585; H01R 12/722; H01R 12/724; G06F 3/0676; G11B 33/022; G11B 33/122; G11B 2220/2516
   USPC .......................................................... 439/82
   See application file for complete search history.

(56) References Cited

U.S. PATENT DOCUMENTS

| | | | |
|---|---|---|---|
| 10,374,345 | B2 | 8/2019 | Yamamoto et al. |
| 10,680,368 | B2 | 6/2020 | Yamamoto et al. |
| 10,903,595 | B2 | 1/2021 | Yamamoto et al. |
| 11,342,650 | B2 | 5/2022 | Liu et al. |
| 2002/0142627 | A1 | 10/2002 | Kameyama |
| 2009/0186495 | A1 | 7/2009 | Taylor |
| 2009/0186534 | A1 | 7/2009 | Taylor |
| 2012/0040540 | A1 | 2/2012 | Lee et al. |
| 2014/0206233 | A1 | 7/2014 | Kao et al. |
| 2021/0407550 | A1 | 12/2021 | Okano et al. |
| 2022/0247064 | A1 | 8/2022 | Liu et al. |
| 2023/0282996 | A1* | 9/2023 | Ishizaki ............... G11B 33/122 439/82 |

FOREIGN PATENT DOCUMENTS

| | | |
|---|---|---|
| JP | H11154572 A | 6/1999 |
| JP | 2002291135 A | 10/2002 |
| JP | 2006303133 A | 11/2006 |
| JP | 2011510454 A | 3/2011 |

OTHER PUBLICATIONS

Japanese Office Action (and an English language translation thereof) dated May 7, 2025, issued in counterpart Japanese Application No. 2022-034178.

* cited by examiner

ELECTRONIC DEVICE AND ELECTRONIC COMPONENT

CROSS-REFERENCE TO RELATED APPLICATIONS

This application is based upon and claims the benefit of priority from Japanese Patent Application No. 2022-034178, filed on Mar. 7, 2022, the entire contents of which are incorporated herein by reference.

FIELD

Embodiments described herein relate generally to an electronic device and an electronic component.

BACKGROUND

In an electronic device, various electronic components are mounted on a substrate. Some electronic components have a protrusion on a base. To mount such an electronic component on the substrate, the protrusion is inserted into a hole in the substrate.

In mounting the electronic component on the substrate, there may be situation that the protrusion abuts on the surface of the substrate and is not insertable into the hole because of misalignment between the protrusion and the hole. In this case, the base of the electronic component may not be set at an intended position on the substrate, which makes it difficult to mount the electronic component on the substrate.

DETAILED DESCRIPTION

In general, according to an embodiment, an electronic device includes a substrate and an electronic component. The substrate with a first hole and a second hole includes a first surface facing a first direction and to which the first hole and the second hole are open apart from each other. The electronic component is mounted on the substrate. The electronic component includes a base, a first protrusion, and a second protrusion. The base is placed on the first surface or placed apart from the first surface in the first direction. The first protrusion protrudes from the base, is at least partially accommodated in the first hole, and has a first end being an end of the first protrusion in a second direction opposite to the first direction. The second protrusion protrudes from the base, is at least partially accommodated in the second hole, and has a second end being an end of the second protrusion in the second direction. In a direction orthogonal to the first surface, the first end of the first protrusion is more apart from the first surface than the second end of the second protrusion. The first protrusion has a first inclined surface extending obliquely from the first end with respect to the first direction. The second protrusion has a second inclined surface extending obliquely from the second end with respect to the first direction. In a third direction orthogonal to the first direction the first inclined surface is longer in length than the second inclined surface.

First Embodiment

Hereinafter, a first embodiment will be described with reference to FIGS. 1 to 8. In the present specification, components according to embodiments and descriptions of the components may be described in a plurality of expressions. The components and the descriptions thereof are examples, and are not limited by the expressions of the present specification. The components may be identified by names different from the names in the present specification. The components may be described by expressions different from the expressions in the present specification.

Figure 1:
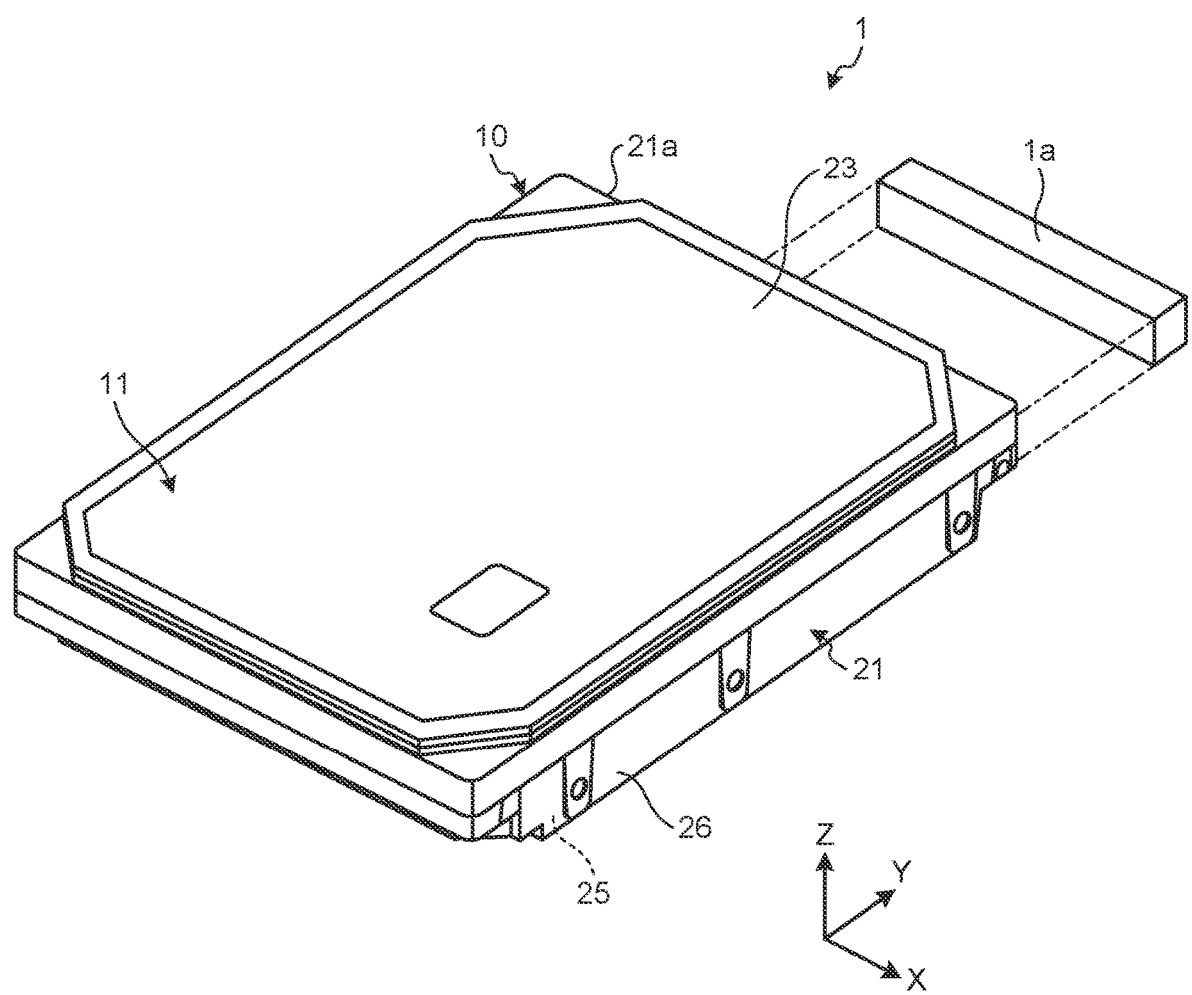
FIG. 1 is an exemplary perspective view illustrating a hard disk drive (HDD) according to a first embodiment.

FIG. 1 is an exemplary perspective view illustrating a hard disk drive (HDD) 10 according to the first embodiment. The HDD 10 is mounted on an external device 1, for example. The HDD 10 is an example of the electronic device and may also be referred to as a storage device or a disk device. The electronic device is not limited to the HDD 10 and may be a solid state drive (SSD) or another device.

The external device 1 is, for example, any of various computers such as a personal computer, a supercomputer, a server, a television receiver, or a game machine, or a device such as an external hard drive (HDD). The external device 1 may also be referred to as a host device.

As illustrated in the drawings, in the present specification, an X axis, a Y axis, and a Z axis are defined for convenience. The X axis, the Y axis, and the Z axis are orthogonal to each other. The X axis is provided along the width of the HDD 10. The Y axis is provided along the length of the HDD 10. The Z axis is provided along the thickness of the HDD 10.

Further, in the present specification, an X direction, a Y direction, and a Z direction are defined. The X direction is a direction along the X axis and includes a +X direction indicated by an arrow of the X axis and a −X direction which is an opposite direction of the arrow of the X axis. The Y direction is a direction along the Y axis and includes a +Y direction indicated by an arrow of the Y axis and a −Y direction which is an opposite direction of the arrow of the Y axis. The Z direction is a direction along the Z axis and includes a +Z direction indicated by an arrow of the Z axis and a −Z direction which is an opposite direction of the arrow of the Z axis.

Figure 2:
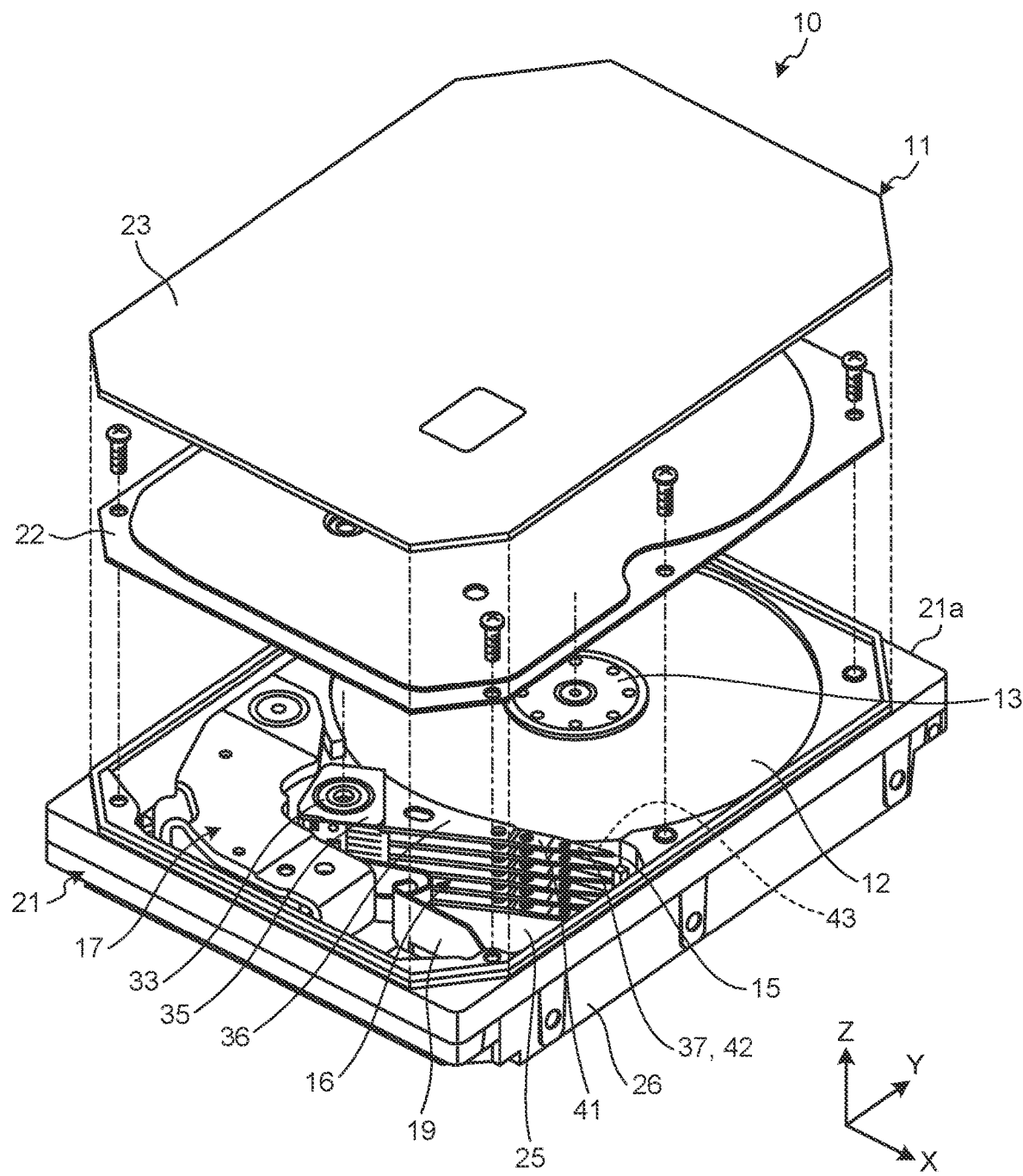
FIG. 2 is an exemplary perspective view illustrating the HDD of the first embodiment in an exploded manner.

FIG. 2 is an exemplary perspective view illustrating the HDD 10 of the first embodiment in an exploded manner. As illustrated in FIG. 2, the HDD 10 includes a housing 11, a plurality of magnetic disks 12, a spindle motor 13, a plurality of magnetic heads 15, an actuator assembly 16, a voice coil motor (VCM) 17, and a flexible printed circuit (FPC) 19. The magnetic disk 12 may also be referred to as a storage medium.

The housing 11 includes a base 21, an inner cover 22, and an outer cover 23. The base 21 is a bottomed container and has a bottom wall 25 and a side wall 26. The bottom wall 25 has a substantially rectangular (quadrangular) plate shape extending along the X-Y plane. The side wall 26 protrudes in the +Z direction from the outer edge of the bottom wall 25.

The inner cover 22 is attached to an end of the side wall 26 in the +Z direction with screws, for example. The outer cover 23 covers the inner cover 22 and is fixed to the end of the side wall 26 in the +Z direction by welding, for example.

The magnetic disks 12, the spindle motor 13, the magnetic heads 15, the actuator assembly 16, the voice coil motor 17, and the FPC 19 are accommodated in the housing 11.

The magnetic disk 12 is, for example, a disk including a magnetic recording layer or layers on at least one of the upper surface and the lower surface. The diameter of the magnetic disk 12 is, for example, 3.5 inches, but is not limited to this example. The spindle motor 13 supports and rotates the plurality of magnetic disks 12 stacked at intervals.

The magnetic heads 15 record and reproduce information on and from the recording layers of the magnetic disks 12. In other words, the magnetic heads 15 read and write information from and to the magnetic disks 12. The magnetic disks 12 store information written by the magnetic heads 15. The magnetic heads 15 are supported by the actuator assembly 16.

The actuator assembly 16 is rotatably supported by a support shaft 33 disposed away from the magnetic disks 12. The VCM 17 rotates and places the actuator assembly 16 in a desired position.

The actuator assembly 16 includes an actuator block 35, a plurality of arms 36, and a plurality of head suspension assemblies (suspensions) 37. The suspension 37 may also be referred to as a head gimbal assembly (HGA).

The actuator block 35 is rotatably supported by the support shaft 33 via a bearing, for example. The plurality of arms 36 protrude from the actuator block 35 in a direction substantially orthogonal to the support shaft 33. The plurality of arms 36 are disposed at intervals in the direction in which the support shaft 33 extends. The arms 36 have a plate shape to enter a gap between the adjacent magnetic disks 12.

Each suspension 37 is attached to a distal end of its corresponding arm 36 and protrudes from the arm 36. Each of the suspensions 37 includes a base plate 41, a load beam 42, and a flexure 43. Further, the magnetic heads 15 are attached to the suspensions 37.

The base plate 41 and the load beam 42 are made of, for example, stainless steel. The base plate 41 is attached to the distal end of the arm 36. The load beam 42 has a plate shape and a thinner thickness than the base plate 41. The load beam 42 is attached to a distal end of the base plate 41 and protrudes from the base plate 41.

The flexure 43 has an elongated band shape. The shape of the flexure 43 is not limited to this example. The flexure 43 is a multilayer plate including a metal plate (backing layer) made of stainless steel, an insulating layer formed on the metal plate, a conductive layer formed on the insulating layer and constituting a plurality of wires (wiring patterns), and a protective layer (insulating layer) covering the conductive layer.

The flexure 43 includes a displaceable gimbal (elastic support) at one end and above the load beam 42. The magnetic head 15 is mounted on the gimbal. The other end of the flexure 43 is connected to the FPC 19. Thereby, the FPC 19 is electrically connected to the magnetic heads 15 via the wiring of the flexure 43.

Figure 3:
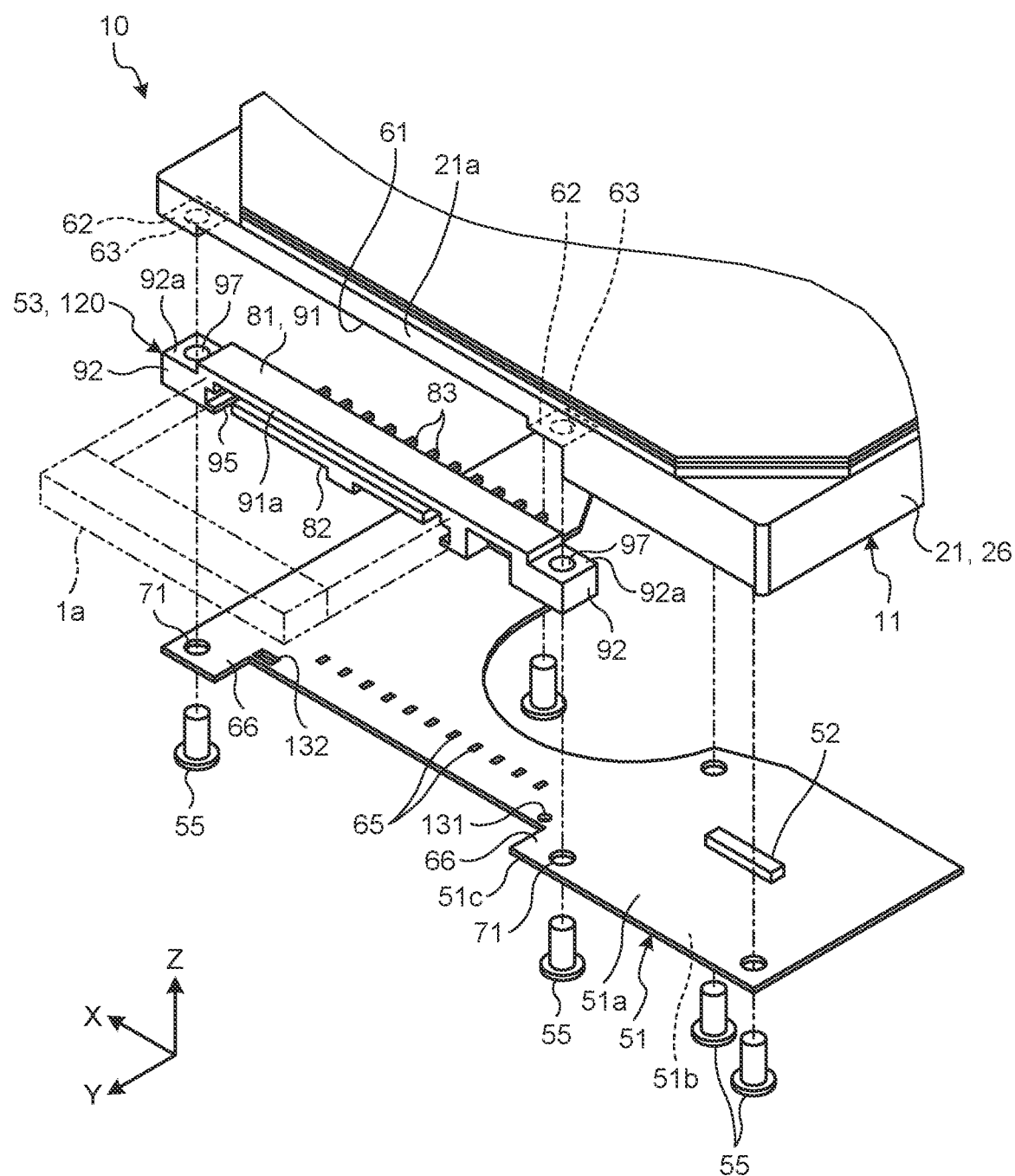
FIG. 3 is an exemplary perspective view illustrating a part of the HDD of the first embodiment in an exploded manner.

FIG. 3 is an exemplary perspective view illustrating a part of the HDD 10 of the first embodiment in an exploded manner. As illustrated in FIG. 3, the HDD 10 further includes a printed circuit board (PCB) 51, a relay connector 52, an interface (I/F) connector 53, and a plurality of screws 55. The PCB 51 is an example of the substrate. The I/F connector 53 is an example of the electronic component. The electronic component is not limited to the I/F connector 53 and may be any of various electronic components.

The PCB 51 is located outside the housing 11. The PCB 51 is, for example, a rigid board such as a glass epoxy board, and is a multilayer board, a build-up board, or the like. The PCB 51 extends along the X-Y plane and is attached to the bottom wall 25 with the screws 55, for example. The PCB 51 may be attached to the bottom wall 25 by another method such as snap-fitting with a hook.

The PCB 51 has a mounting surface 51a and an outer surface 51b. The mounting surface 51a is an example of the first surface. The mounting surface 51a is substantially flat along the X-Y plane and faces the +Z direction. The +Z direction is an example of the first direction. The PCB 51 is attached to the bottom wall 25 with the mounting surface 51a facing the bottom wall 25. The outer surface 51b is opposite the mounting surface 51a.

The relay connector 52 and the I/F connector 53 are mounted on the mounting surface 51a of the PCB 51 outside the housing 11. Various memories such as a RAM, a ROM, and a buffer memory, a controller, a servo controller, a coil, a capacitor, and other electronic components may be further mounted on the PCB 51.

The relay connector 52 is connected to the FPC 19 through, for example, a hole penetrating the bottom wall 25. Thus, the PCB 51 is electrically connected to the FPC 19 via the relay connector 52. Further, the PCB 51 is electrically connected to the magnetic heads 15 via the relay connector 52, the FPC 19, and the flexure 43.

The I/F connector 53 is a connector conforming to an interface standard such as Serial ATA (SATA). The I/F connector 53 may conform to serial attached SCSI (SAS), NVM express (NVMe), or another interface standard.

The I/F connector 53 is connected to an I/F connector 1a of the external device 1. For example, the controller of the PCB 51 may communicate with the external device 1 via the I/F connector 53 and the I/F connector 1a.

Hereinafter, a mounting structure of the I/F connector 53 will be described in detail. The base 21 of the housing 11 is provided with a cutout 61. The cutout 61 is located at a corner between the bottom wall 25 and the side wall 26, and is open to an end 21a of the base 21 in the +Y direction. The base 21 has two support surfaces 62. The support surfaces 62 are a part of the bottom surface of the cutout 61 in the +Z direction.

The support surfaces 62 are also a part of the outer surface of the base 21 and face the outside of the housing 11. For example, the support surface 62 is substantially flat along the X-Y plane and faces the −Z direction. The support surface 62 faces the mounting surface 51a of the PCB 51 with an interval. The support surface 62 is not limited to this example. The two support surfaces 62 are separated from each other in the X direction.

The base 21 is provided with two screw holes 63. The two screw holes 63 are open to the two corresponding support surfaces 62. The inner surfaces of the screw holes 63 are female screws.

The PCB 51 includes a plurality of electrodes 65 and two attachment regions 66. The I/F connector 53 is mounted on the PCB 51 by being electrically connected to the electrode 65. Further, the I/F connector 53 reinforces the connection between the I/F connector 53 and the PCB 51 by being attached to the attachment regions 66.

The electrodes 65 are mounted on the mounting surface 51a. Each electrode 65 is, for example, a pad placed on the mounting surface 51a. The electrode 65 may be a through hole open to the mounting surface 51a. The electrode 65 is electrically connected to, for example, various components mounted on the PCB 51 through a wiring pattern on the PCB 51.

The attachment regions 66 are a part of the PCB 51. Each of the two attachment regions 66 has a part of the mounting surface 51a and a part of the outer surface 51b. The two attachment regions 66 are separated from each other in the X direction.

Figure 4:
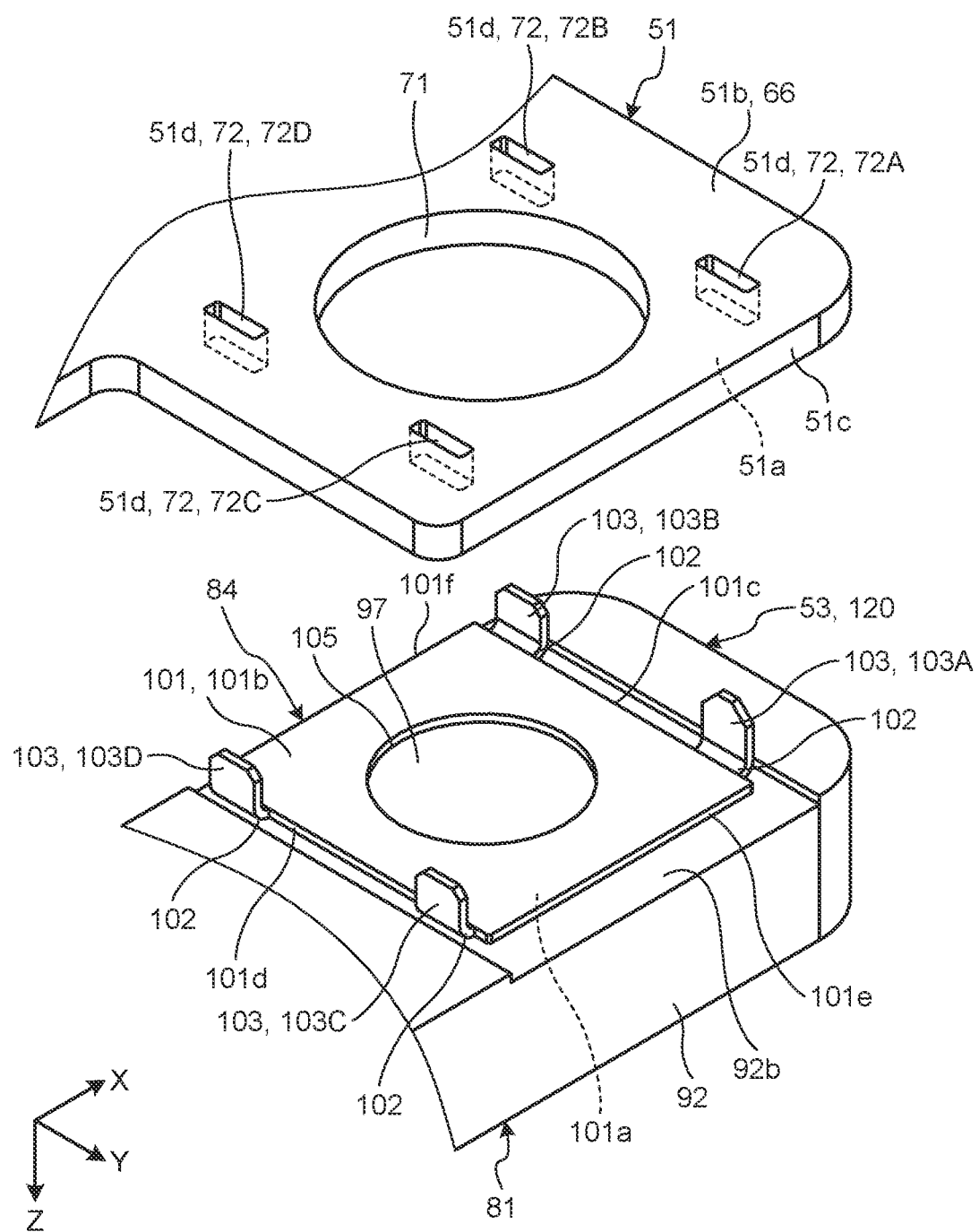
FIG. 4 is an exemplary perspective view illustrating a part of an interface (I/F) connector and an attachment region of the first embodiment.

FIG. 4 is an exemplary perspective view illustrating a part of the I/F connector 53 and the attachment region 66 of the first embodiment. FIG. 4 illustrates one of the two attachment regions 66. As illustrated in FIG. 4, the two attachment regions 66 are each provided with a through hole 71 and four through holes 72. Thus, a total number of the through holes 72 in the PCB 51 is eight. The numbers of through holes 71 and through holes 72 are not limited to this example.

The four through holes 72 may be individually referred to as through holes 72A, 72B, 72C, and 72D. The through hole 72A is an example of the first hole. The through holes 72B, 72C, and 72D are examples of the second hole. The description common in the through holes 72A, 72B, 72C, and 72D will be described as the description of the through hole 72.

The through hole 71 and the through holes 72 penetrate the PCB 51 in the substantially Z direction and are open to the mounting surface 51a and the outer surface 51b. The through hole 71 and the through holes 72 are separated from each other in directions along the mounting surface 51a.

The through hole 71 has a substantially circular section and is substantially concentric (coaxial) with the screw hole 63. In other words, the through hole 71 is substantially at the same position as the screw hole 63 when viewed in the Z direction. The section of the through hole 71 is orthogonal to the Z direction in which the through hole 71 extends. The diameter of the through hole 71 is longer than the outer diameter of the screw hole 63.

The through holes 72 have a substantially rectangular section extending substantially in the Y direction. The through holes 72 may have a section of another shape such as a circular shape. The through holes 72 are disposed around the through hole 71.

The through holes 72A and 72B are arranged at an interval in the Y direction. The through holes 72C and 72D are arranged at an interval in the Y direction. The through holes 72A and 72B and the through holes 72C and 72D are arranged at intervals in the X direction. The through holes 72A and 72C are closer to an edge 51c of the PCB 51 in the +Y direction than the through holes 72B and 72D.

The PCB 51 further includes inner surfaces 51d of the through holes 72. Each inner surface 51d is formed by metal plating. The plating forming the inner surface 51d is electrically connected to a ground pattern of the PCB 51, for example.

Figure 5:
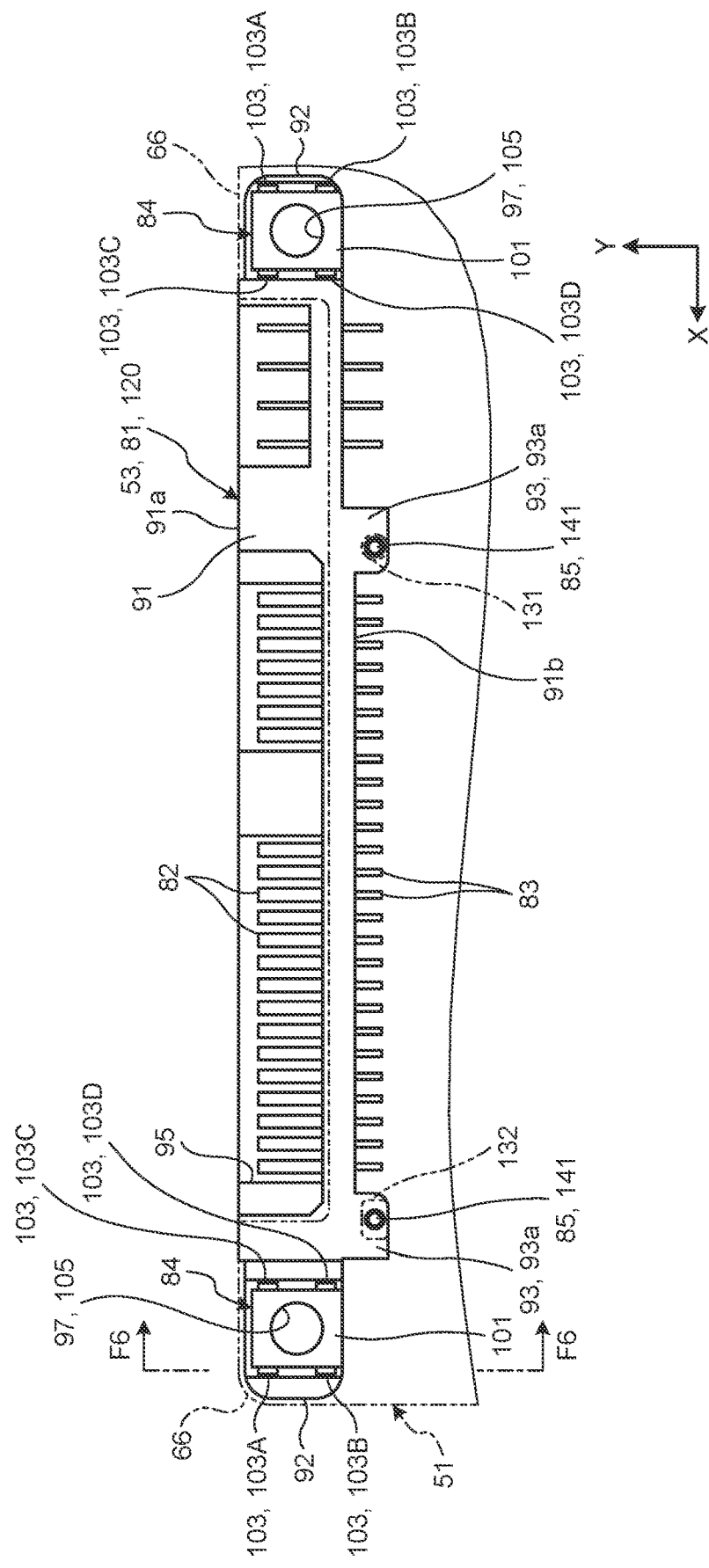
FIG. 5 is an exemplary bottom view illustrating the I/F connector of the first embodiment.

FIG. 5 is an exemplary bottom view illustrating the I/F connector 53 of the first embodiment. As illustrated in FIG. 5, the I/F connector 53 has, for example, a substantially rectangular parallelepiped shape extending in the substantially X direction. For example, the I/F connector 53 is longer in length in the X direction than in the Y direction and in the Z direction.

The I/F connector 53 includes a base 81, a plurality of connecting terminals 82, a plurality of mounting terminals 83, two attachment plates 84, and two positioning pins 85. The mounting terminal 83 is an example of a terminal. The attachment plate 84 is an example of an attachment. The positioning pin 85 is an example of a third protrusion and a protrusion.

The base 81 has a substantially rectangular parallelepiped shape extending substantially in the X direction. The base 81 is made of, for example, an insulator such as synthetic resin. The shape and material of the base 81 are not limited to this example.

The base 81 is located on the mounting surface 51a of the PCB 51. The base 81 may be apart from the mounting surface 51a in the +Z direction. In the present embodiment, the base 81 is located between the housing 11 and the PCB 51.

The base 81 includes a connecting portion 91, two reinforcing portions 92, and two positioning portions 93. The connecting portion 91, the reinforcing portions 92, and the positioning portions 93 are a part of the base 81, which are integrated.

The connecting portion 91 is provided with a socket 95. The socket 95 is a cutout that is open to an end 91a of the connecting portion 91 in the +Y direction. The connecting terminal 82 is disposed in the socket 95. The connecting terminal 82 is a communication and power supply terminal conforming to the SATA standard. The connecting terminal 82 is not limited to this example.

The connecting terminal 82 extends in the +Y direction from the connecting portion 91 inside the socket 95. For example, by fitting the I/F connectors 1a and 53 together, the connecting terminal 82 of the I/F connector 53 is electrically connected to the I/F connector 1a.

The mounting terminals 83 extend from an end 91b of the connecting portion 91 in the −Y direction, for example. The mounting terminals 83 are electrically connected to the corresponding connecting terminals 82 inside the connecting portion 91. The mounting terminals 83 are bonded to the corresponding electrodes 65 of the PCB 51 by, for example, soldering. Thereby, the I/F connector 53 is mounted on the PCB 51.

The two reinforcing portions 92 protrude from both ends of the connecting portion 91 in the X direction. Thus, the connecting portion 91 connects between the two reinforcing portions 92. The two reinforcing portions 92 have a substantially rectangular parallelepiped shape. The reinforcing portions 92 may have another shape. The reinforcing portions 92 are located between the attachment regions 66 of the PCB 51 and the support surfaces 62 of the base 21.

Each of the two reinforcing portions 92 has an upper surface 92a illustrated in FIG. 3 and a lower surface 92b illustrated in FIG. 4. The expressions "upper" and "lower" in the present embodiment are defined for convenience based on the orientation of the HDD 10 in FIGS. 1 to 3, and are unintended to limit orientation, position, usage mode, and other conditions.

As illustrated in FIG. 3, the upper surface 92a is substantially flat along the X-Y plane and faces the +Z direction. The upper surface 92a faces its corresponding support surface 62. The lower surface 92b is opposite the upper surface 92a. As illustrated in FIG. 4, the lower surface 92b is substantially flat along the X-Y plane and faces the −Z direction. The lower surface 92b faces the mounting surface 51a of the attachment region 66.

The two reinforcing portions 92 are each provided with a through hole 97. The through hole 97 has a substantially circular section and is substantially concentric (coaxial) with the screw hole 63 and the through hole 71. In other words, the through hole 97 is substantially at the same position as the screw hole 63 and the through hole 71 when viewed in the Z direction. The diameter of the through hole 97 is the same as or longer than the outer diameter of the screw hole 63. The diameter of the through hole 97 is shorter than the diameter of the through hole 71.

The upper surface 92a of the reinforcing portion 92 abuts on its corresponding support surface 62. Thus, the through hole 97 communicates with the screw hole 63. There may be a gap or another object between the upper surface 92a and the support surface 62.

As illustrated in FIG. 5, the two positioning portions 93 protrude from the end 91b of the connecting portion 91. The two positioning portions 93 are separated from each other in the X direction. At least one of the mounting terminals 83 is located between the two positioning portions 93.

Each of the two positioning portions 93 has a lower surface 93a. The lower surface 93a is an example of a second surface. The lower surface 93a is substantially flat along the X-Y plane and faces the −Z direction. The lower surface 93a faces the mounting surface 51a of the PCB 51.

As illustrated in FIG. 4, the attachment plate 84 is made of, for example, a pressed metal plate. Each of the two attachment plates 84 includes a plate portion 101, four curved portions 102, and four reinforcing protrusions 103. The attachment plate 84 is not limited to this example.

The four reinforcing protrusions 103 may be individually referred to as reinforcing protrusions 103A, 103B, 103C, and 103D. The reinforcing protrusion 103A is an example of the first protrusion. The reinforcing protrusions 103B, 103C, and 103D are examples of the second protrusion. The description common in the reinforcing protrusions 103A, 103B, 103C, and 103D will be described as the description of the reinforcing protrusion 103.

The plate portion 101 has a substantially quadrangular plate shape (rectangular parallelepiped shape) extending along the X-Y plane. The plate portion 101 has an upper surface 101a, a lower surface 101b, and four side surfaces 101c, 101d, 101e, and 101f.

The upper surface 101a is substantially flat along the X-Y plane and faces the +Z direction. The upper surface 101a faces the lower surface 92b of its corresponding reinforcing portion 92. The lower surface 101b is opposite the upper surface 101a. The lower surface 101b is substantially flat along the X-Y plane and faces the −Z direction. The lower surface 101b faces the mounting surface 51a of the attachment region 66.

The four side surfaces 101c, 101d, 101e, and 101f form the edge of the rectangular parallelepiped plate portion 101. The four side surfaces 101c, 101d, 101e, and 101f connect between the edge of the upper surface 101a and the edge of the lower surface 101b.

The side surfaces 101c and 101d extend in the Y direction (+Y direction and −Y direction). The side surfaces 101c and 101d may extend in mutually different directions or may be provided with irregularities. The side surface 101c faces the outside of the I/F connector 53 in the X direction. The side surface 101d is opposite the side surface 101c and faces the inside of the I/F connector 53 in the X direction. Thus, the side surfaces 101d of the two attachment plates 84 face each other with an interval therebetween.

The side surfaces 101e and 101f extend in the X direction. The side surfaces 101e and 101f may extend in mutually different directions or may be provided with irregularities. The side surface 101e extends between the end of the side surface 101c and the end of the side surface 101d in the +Y direction and faces the +Y direction. The side surface 101f is opposite the side surface 101e. The side surface 101f extends between the end of the side surface 101c and the end of the side surface 101d in the −Y direction and faces the −Y direction.

The plate portion 101 is provided with a through hole 105. The through hole 105 penetrates the plate portion 101 substantially in the Z direction and is open to the upper surface 101a and the lower surface 101b. The through hole 105 has a substantially circular section and is substantially concentric (coaxial) with the screw hole 63 and the through holes 71 and 97. The diameter of the through hole 105 is the same as or longer than the outer diameter of the screw hole 63. The diameter of the through hole 105 is shorter than the diameter of the through hole 71.

The plate portion 101 is attached to the lower surface 92b of the corresponding reinforcing portion 92. The plate portion 101 is thus located between the mounting surface 51a of the attachment region 66 and the support surface 62 of the base 21.

By attaching the plate portions 101 to the corresponding reinforcing portions 92, the two attachment plates 84 are attached to the two reinforcing portions 92 apart from each other in the X direction. The X direction is an example of a fourth direction.

The through hole 105 of the plate portion 101 communicates with the through hole 97 of the reinforcing portion 92. Thus, the through hole 97 communicates with the screw hole 63 and the through hole 105. Further, the through hole 105 of the plate portion 101 communicates with the through hole 71 of the PCB 51 through a gap.

The curved portions 102 and the reinforcing protrusions 103 are formed by bending a part of the metal plates forming the plate portions 101, for example. The curved portions 102 and the reinforcing protrusions 103 may be formed by another method.

The four curved portions 102 are located between the four corresponding reinforcing protrusions 103 and the plate portion 101. The curved portion 102 is bent in an arc shape. One end of the curved portion 102 is connected to the plate portion 101. The corresponding reinforcing protrusion 103 protrudes from the other end of the curved portion 102. The curved portion 102 may be omitted, and the reinforcing protrusion 103 may directly protrude from the plate portion 101.

The four curved portions 102 are connected to the side surface 101c or the side surface 101d of the plate portion 101. For example, two curved portions 102 connected to the reinforcing protrusions 103A and 103B protrude from the side surface 101c, and two curved portions 102 connected to the reinforcing protrusions 103C and 103D protrude from the side surface 101d. Thus, the reinforcing protrusions 103A and 103B are located more outside than the reinforcing protrusions 103C and 103D in the I/F connector 53 in the X direction. The arrangement of the curved portions 102 and the reinforcing protrusions 103 is not limited to this example.

The reinforcing protrusions 103A and 103B are separated from each other in the Y direction. The two reinforcing protrusions 103C and 103D are separated from each other in the Y direction. The reinforcing protrusions 103A and 103B and the reinforcing protrusions 103C and 103D are separated from each other in the X direction. Thus, the reinforcing protrusions 103 are all separated from each other.

The reinforcing protrusions 103A and 103C are disposed in the vicinity of the side surface 101e. Thus, the reinforcing protrusions 103A and 103C are closer to the side surface 101e than to the centers of the side surfaces 101c and 101d. The reinforcing protrusions 103B and 103D are disposed in the vicinity of the side surface 101f. Thus, the reinforcing protrusions 103B and 103D are closer to the side surface 101f than to the centers of the side surfaces 101c and 101d.

The four reinforcing protrusions 103 protrude in the −Z direction from the four corresponding curved portions 102. The −Z direction is an example of the second direction and a fifth direction. The reinforcing protrusions 103 have a substantially rectangular plate shape (rectangular parallelepiped shape) extending along the Y-Z plane. Thus, the reinforcing protrusions 103 are longer in length in the Y direction than in the X direction.

Figure 6:
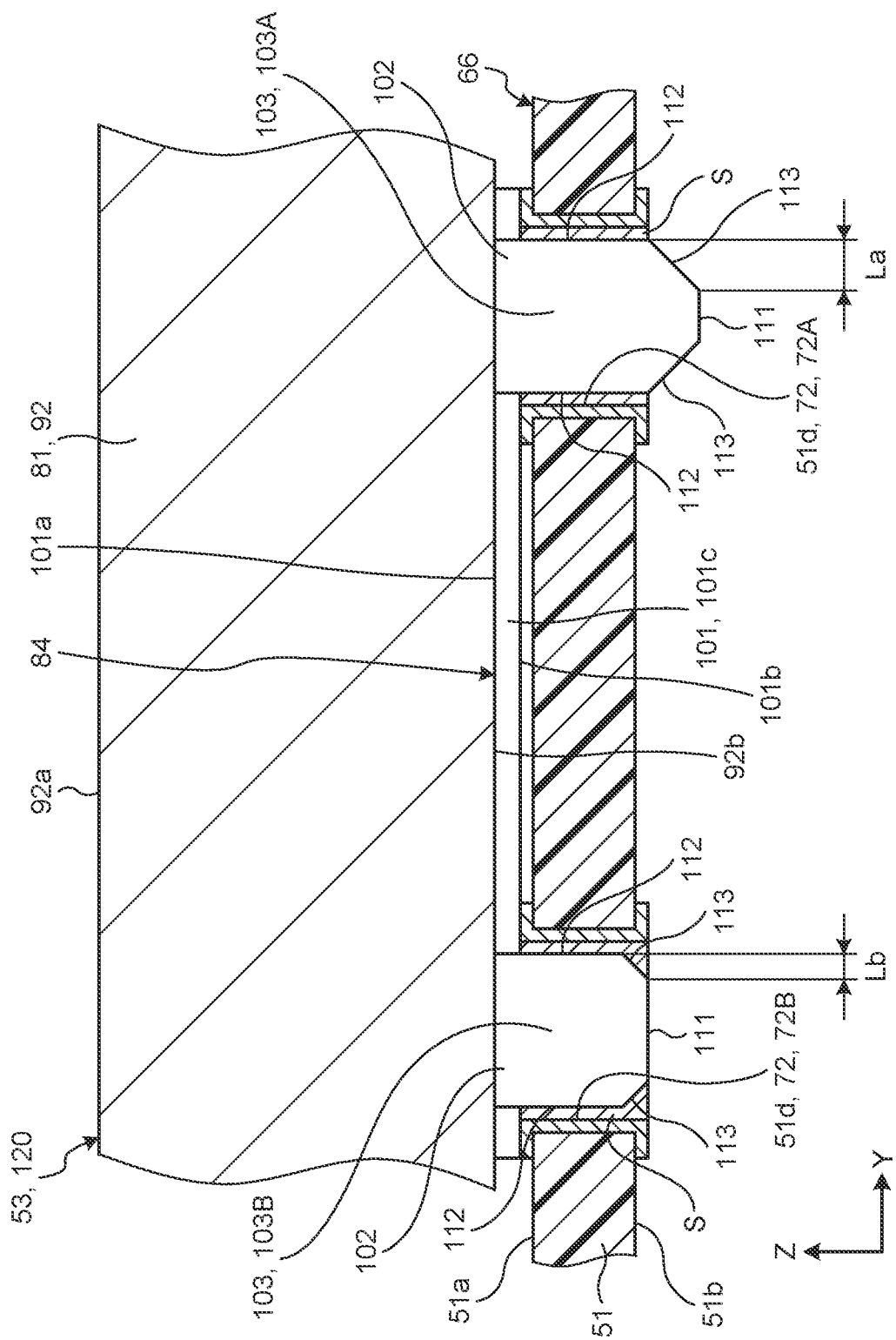
FIG. 6 is an exemplary sectional view of a part of a printed circuit board (PCB) and a part of the I/F connector of the first embodiment taken along the line F6-F6 in FIG. 5.

FIG. 6 is an exemplary sectional view of a part of the PCB 51 and a part of the I/F connector 53 of the first embodiment taken along the line F6-F6 in FIG. 5. As illustrated in FIG. 6, the four reinforcing protrusions 103 are inserted into the four corresponding through holes 72.

The reinforcing protrusion 103A is at least partially accommodated in the through hole 72A. Further, the reinforcing protrusions 103B, 103C, and 103D are at least partially accommodated in the respective through holes 72B, 72C, and 72D.

In both the X direction and the Y direction, the reinforcing protrusion 103 is shorter in length than the through hole 72. The difference in length between the through hole 72 and the reinforcing protrusion 103 is smaller in the Y direction than in the X direction. The dimensions of the through hole 72 and the reinforcing protrusion 103 are not limited to this example.

Each of the four reinforcing protrusions 103 has an end surface 111, two side surfaces 112, and two tapered surfaces 113. The end surface 111 of the reinforcing protrusion 103A is an example of the first end and an end surface. The tapered surface 113 of the reinforcing protrusion 103A is an example of the first inclined surface and a tapered surface. Each end surface 111 of the reinforcing protrusions 103B, 103C, and 103D is an example of the second end. Each tapered surface 113 of the reinforcing protrusions 103B, 103C, and 103D is an example of the second inclined surface. The tapered surface 113 may also be referred to as an edge.

The end surface 111 is located at the end of the reinforcing protrusion 103 in the −Z direction. The end surface 111 is substantially flat along the X-Y plane and faces the −Z direction. The shape of the end surface 111 may be another shape such as an arc-shaped curved surface.

The two side surfaces 112 are located at both ends of the reinforcing protrusion 103 in the Y direction. In other words, the two side surfaces 112 are separated from each other in the Y direction. The side surfaces 112 extend in the −Z direction from the curved portions 102. That is, the two side surfaces 112 extend substantially in parallel.

The two tapered surfaces 113 extend between the corresponding side surfaces 112 and end surfaces 111. Thus, the two tapered surfaces 113 are separated from each other in the Y direction. The Y direction is an example of the third direction and a sixth direction.

The two tapered surfaces 113 extend from the end of the side surfaces 112 in the −Z direction toward the end surface 111 to approach each other. The end of the tapered surface 113 in the −Z direction is connected to the end surface 111. The end surface 111 extends in the Y direction along the mounting surface 51a of the PCB 51 between the two tapered surfaces 113. In other words, each of the two tapered surfaces 113 extends obliquely with respect to the Z direction (+Z direction and −Z direction) from the end surface 111 such that the width of the reinforcing protrusion 103 tapers toward the end surface 111 in the Y direction.

In the reinforcing protrusion 103 provided with the tapered surfaces 113, the corners between the end surface 111 and the side surfaces 112 are chamfered. In the present embodiment, the tapered surface 113 extends in a substantially linear manner. The tapered surface 113 may extend obliquely with respect to the Z direction in a curved manner.

The two tapered surfaces 113 are substantially mirror-symmetrical to each other. Thus, the absolute value of the angle between the end surface 111 and one of the tapered surfaces 113 is substantially equal to the absolute value of the angle between the end surface 111 and the other tapered surface 113. Further, in the Y direction the two tapered surfaces 113 have substantially the same length.

The reinforcing protrusion 103 may have one tapered surface 113. In this case, the tapered surface 113 extends from one side surface 112 toward the other side surface 112. Also in this example, the tapered surface 113 extends obliquely with respect to the Z direction from the end surface 111 such that the width of the reinforcing protrusion 103 tapers toward the end surface 111 in the Y direction.

The shapes of the reinforcing protrusions 103B, 103C, and 103D are substantially the same or substantially mirror-symmetrical. The shape of the reinforcing protrusion 103A is different from the shapes of the reinforcing protrusions 103B, 103C, and 103D as follows.

In the Z direction, the reinforcing protrusion 103A is longer in length than the reinforcing protrusions 103B, 103C, and 103D. Thus, in the Z direction, the end surface 111 of the reinforcing protrusion 103A is more apart from the mounting surface 51a than the respective end surfaces 111 of the reinforcing protrusions 103B, 103C, and 103D. The Z direction is an example of the direction orthogonal to the first surface.

In the Y direction a length La of each tapered surface 113 of the reinforcing protrusion 103A is longer than a length Lb of each tapered surface 113 of the reinforcing protrusion 103B. The length La of each tapered surface 113 of the reinforcing protrusion 103A is longer than the length of each tapered surface 113 of the reinforcing protrusions 103C and 103D in the Y direction.

In the Y direction the reinforcing protrusion 103A has substantially the same width as the reinforcing protrusions 103B, 103C, and 103D. Thus, the end surface 111 of the reinforcing protrusion 103A is shorter in length than the end surfaces 111 of the reinforcing protrusions 103B, 103C, and 103D in the Y direction.

In the present embodiment, the absolute value of the angle between the end surface 111 of the reinforcing protrusion 103A and the tapered surface 113 is substantially equal to the absolute value of the angle between the end surface 111 of the reinforcing protrusions 103B, 103C, and 103D and the tapered surface 113. The inclination of the tapered surface 113 of the reinforcing protrusion 103A and the inclination of the tapered surface 113 of the reinforcing protrusions 103B, 103C, and 103D may be different from each other.

In the present embodiment, the reinforcing protrusion 103A protrudes from the outer surface 51b of the PCB 51 through the through hole 72A. The reinforcing protrusions 103B, 103C, and 103D do not protrude from the outer surface 51b of the PCB 51. In other words, in the Z direction, the end surfaces 111 of the reinforcing protrusions 103B, 103C, and 103D are closer to the mounting surface 51a than to the outer surface 51b of the PCB 51. The reinforcing protrusions 103B, 103C, and 103D may protrude from the outer surface 51b of the PCB 51.

Two of the screws 55 are fitted into the screw holes 63 of the base 21 through the through hole 105 of the plate portion 101 and the through holes 97 of the reinforcing portion 92. In this manner the I/F connector 53 is attached to the housing 11 with the screws 55. The edge of the through hole 71 of the PCB 51 is away from the screw head of the screw 55. The I/F connector 53 and the PCB 51 may be attached to the housing 11 with the screws 55.

The attachment plate 84 is soldered to the PCB 51. For example, the plate portion 101 and the pad on the attachment region 66 are bonded together with solder S. The reinforcing protrusion 103 and the inner surface 51d of the through hole 72 are bonded together with solder S. In this manner the I/F connector 53 is attached to the attachment region 66 of the PCB 51 to reinforce the solder-connected portion between the mounting terminal 83 of the I/F connector 53 and the electrode 65 of the PCB 51.

As described above, the reinforcing protrusion 103 protrudes from the curved portion 102 in the −Z direction. In another expression, the reinforcing protrusion 103 protrudes from the base 120 of the I/F connector 53 in the −Z direction. The base 120 is a part of the I/F connector 53 including the base 81, the connecting terminals 82, and the plate portion 101 and the curved portion 102 of the attachment plates 84.

The reinforcing protrusion 103 protrudes from the curved portion 102 of the base 120. The mounting terminals 83 extend from the connecting portion 91 of the base 120. In the −Z direction, the end surface 111 of the reinforcing protrusion 103A is more apart from the end of the base 120 than the end surfaces 111 of the reinforcing protrusions 103B, 103C, and 103D. The end of the base 120 is, for example, an end of the curved portion 102 in the −Z direction or an end of the base 81 in the −Z direction.

As illustrated in FIG. 5, the two positioning pins 85 protrude in the −Z direction from the lower surfaces 93a of the corresponding positioning portions 93. The positioning pins 85 have a substantially truncated cone shape and are tapered in the −Z direction. The shape of the positioning pins 85 is not limited to this example.

The PCB 51 is provided with two positioning holes 131 and 132. The positioning holes 131 and 132 are an example of a third hole and a hole. FIG. 5 virtually illustrates the positioning holes 131 and 132 by a two-dot chain line.

The two positioning holes 131 and 132 penetrate the PCB 51 substantially in the Z direction and is open to the mounting surface 51a and the outer surface 51b. The two positioning holes 131 and 132 are separated from each other in the X direction.

The positioning hole 131 has a substantially circular section. The positioning hole 132 has a substantially rectangular section extending in the X direction. The shapes of the positioning holes 131 and 132 are not limited to this example.

The positioning pins 85 have a smaller section than the positioning holes 131 and 132. The two positioning pins 85 are at least partially accommodated in the corresponding positioning holes 131 and 132.

In the present embodiment, the I/F connector 53 further includes two different-colored portions 141. Each different-colored portion 141 is an example of a first different-colored portion and a different-colored portion and may also be referred to as a fiducial mark. The two different-colored portions 141 are located at the ends of the two corresponding positioning pins 85 in the −Z direction.

The different-colored portion 141 is a part of the base 81. However, the different-colored portion 141 is different in color from the rest of the base 81. Thus, the different-colored portion 141 is different in color from the lower surface 93a of the positioning portion 93. For example, the color of the base 81 is black, and the color of the different-colored portion 141 is white.

The different-colored portion 141 is, for example, an ink applied to the positioning pin 85, a part of the positioning pin 85 subjected to laser processing, or a part of the positioning pin 85 having irregularities. The different-colored portion 141 is not limited to this example.

Hereinafter, an exemplary method of mounting the I/F connector 53 on the PCB 51 will be described. A method of mounting the I/F connector 53 on the PCB 51 is not limited to the following method, and another method may be used.

Figure 7:
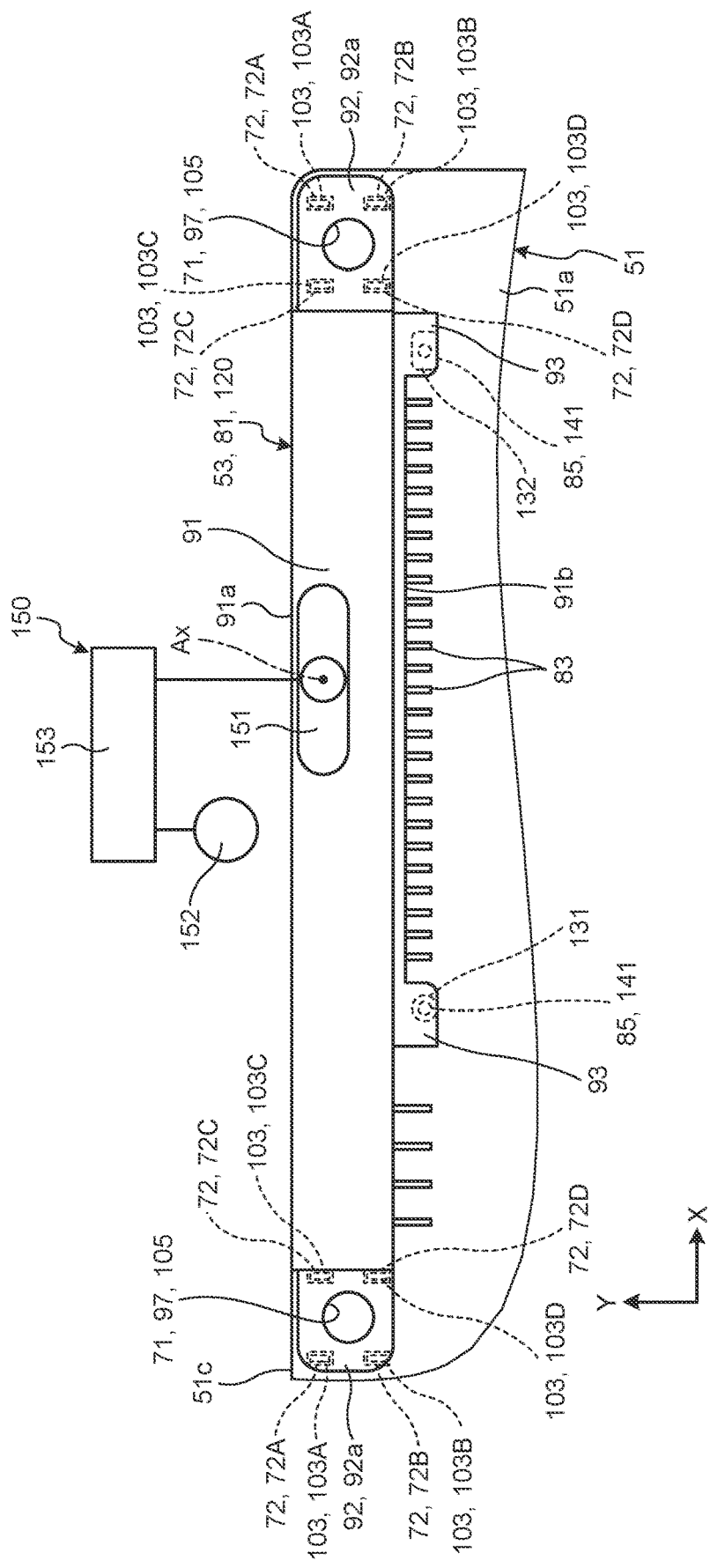
FIG. 7 is an exemplary plan view illustrating a part of the PCB and the I/F connector in a mounting step of the first embodiment.

FIG. 7 is an exemplary plan view illustrating a part of the PCB 51 and the I/F connector 53 in a mounting step of the first embodiment. As illustrated in FIG. 7, the I/F connector 53 is mounted on the PCB 51 by an automatic mounter 150. The automatic mounter 150 includes a nozzle 151, an imaging device 152, and a control unit 153.

The nozzle 151 holds the base 81 of the I/F connector 53. The nozzle 151 holds the base 81 by, for example, sucking the end surface of the base 81 in the +Z direction. The nozzle 151 may hold the base 81 by another method. The portion of the nozzle 151 that holds the base 81 extends substantially in the X direction.

In the present embodiment, the nozzle 151 holds the base 81 at about the center between the two positioning pins 85 in the X direction. The nozzle 151 may hold the base 81 at another position. The nozzle 151 can move in the X direction, the Y direction, and the Z direction with respect to the PCB 51.

The imaging device 152 is, for example, a camera. The imaging device 152 is disposed so as to be able to capture the two different-colored portions 141 of the I/F connector 53 and the PCB 51. The imaging device 152 outputs an image to the control unit 153.

The control unit 153 recognizes the shapes and positions of the PCB 51 and the I/F connector 53 from the image of the PCB 51 and the I/F connector 53 captured by the imaging device 152. The control unit 153 calculates the position (coordinates) of the I/F connector 53 based on the positions of the two different-colored portions 141 in the image.

For example, the control unit 153 sets the position of one of the different-colored portions 141 in the image as the origin of the position of the I/F connector 53. Further, the control unit 153 sets one axis indicating the orientation of the I/F connector 53 based on the positions of the two different-colored portions 141. The image recognition by the control unit 153 is not limited to this example.

The control unit 153 controls the nozzle 151. The control unit 153 moves the nozzle 151 in the X direction and the Y direction according to a program installed in the processor of the control unit 153. The nozzle 151 moves the I/F connector 53 to a desired position.

At the desired position, the reinforcing protrusions 103 are located above the corresponding through holes 72. The two positioning pins 85 are disposed above the corresponding positioning holes 131 and 132.

Next, the nozzle 151 moves the I/F connector 53 in the −Z direction. This causes the reinforcing protrusions 103 to be inserted into the corresponding through holes 72. The two positioning pins 85 are inserted into the corresponding positioning holes 131 and 132.

Figure 8:
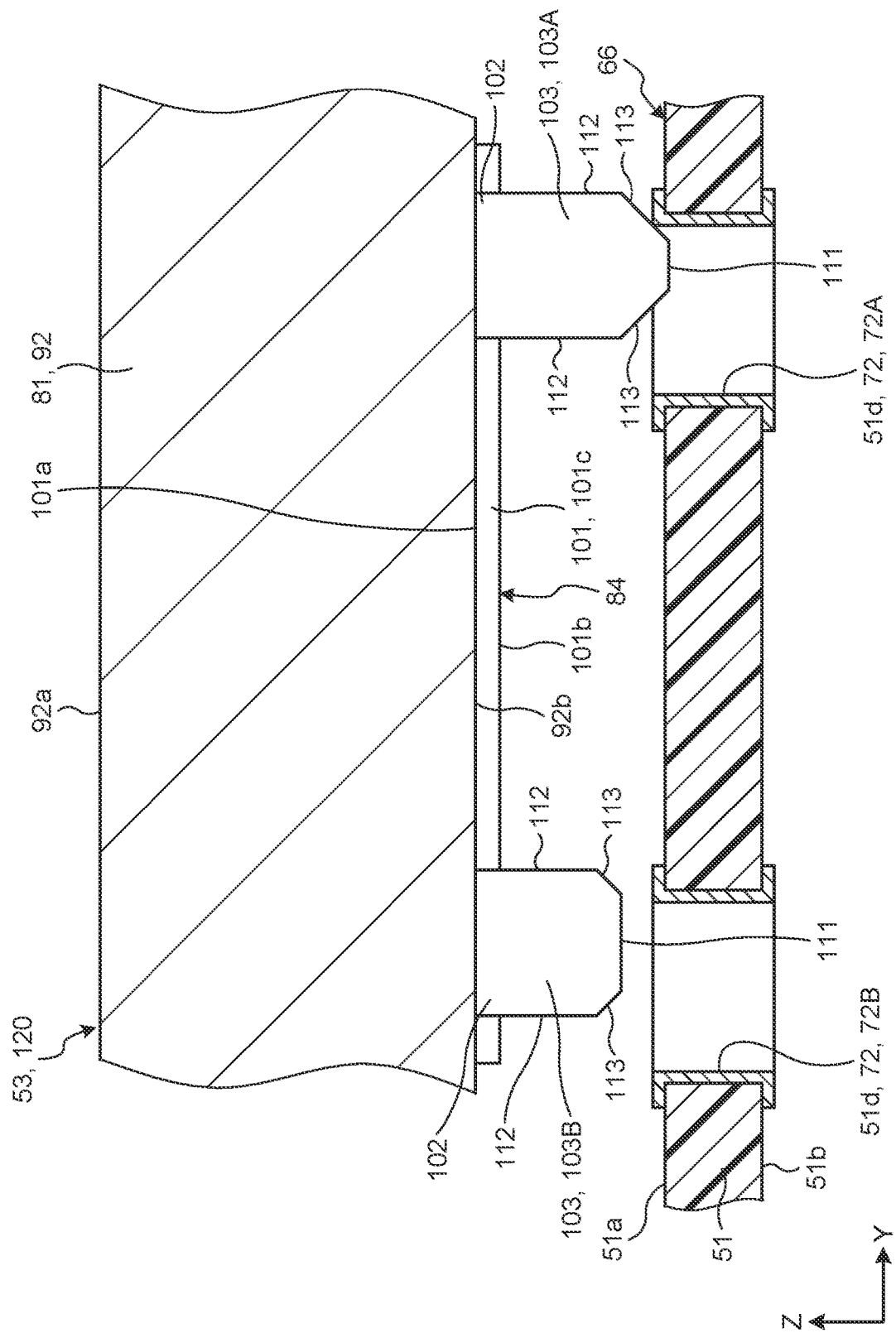
FIG. 8 is an exemplary sectional view illustrating a part of the PCB and a part of the I/F connector in the mounting step of the first embodiment.

FIG. 8 is an exemplary sectional view illustrating a part of the PCB 51 and a part of the I/F connector 53 in the mounting process of the first embodiment. As illustrated in FIG. 8, at the time of inserting the reinforcing protrusion 103 into the through hole 72, the center of the reinforcing protrusion 103 may not align with the center of the through hole 72. For example, such misalignment may occur due to image recognition accuracy, dimensional accuracy of the PCB 51 and the I/F connector 53, or sliding of the I/F connector 53 relative to the nozzle 151.

Due to the misalignment between the center of the reinforcing protrusion 103 the center of the through hole 72, the Y-directional end of the through hole 72A and the tapered surface 113 of the reinforcing protrusion 103A may overlap in the Z direction. In this case, as the nozzle 151 moves the I/F connector 53 in the −Z direction, the tapered surface 113 of the reinforcing protrusion 103A abuts on the edge of the through hole 72A. At this point, the reinforcing protrusions 103B, 103C, and 103D are away from the PCB 51.

As the nozzle 151 further moves the I/F connector 53 in the −Z direction, the tapered surface 113 of the reinforcing protrusion 103A moves the I/F connector 53 in the Y direction such that the center of the reinforcing protrusion 103 approaches the center of the through hole 72. That is, the tapered surface 113 of the reinforcing protrusion 103A corrects the position of the I/F connector 53 with respect to the PCB 51.

After the position of the I/F connector 53 with respect to the PCB 51 is corrected by the reinforcing protrusion 103A, the reinforcing protrusions 103B, 103C, and 103D are inserted into the through holes 72B, 72C, and 72D. The reinforcing protrusions 103B, 103C, and 103D may be inserted into the through holes 72B, 72C, and 72D in the middle of the correction.

The Y-directional ends of the through holes 72B, 72C, and 72D and the end surfaces 111 of the reinforcing protrusions 103B, 103C, and 103D may overlap in the Z direction. However, the tapered surface 113 of the reinforcing protrusion 103A can correct the position of the I/F connector 53 to prevent the end surfaces 111 of the reinforcing protrusions 103B, 103C, and 103D from abutting on the PCB 51.

By correcting the position of the I/F connector 53 with respect to the PCB 51, the reinforcing protrusions 103 are smoothly inserted into the through holes 72. Next, the mounting terminal 83 is soldered to the electrode 65. Further, the reinforcing protrusions 103 and the inner surfaces 51d of the through holes 72 are bonded together with the solder S. In this manner the I/F connector 53 is mounted on the PCB 51.

In the HDD 10 according to the first embodiment described above, the PCB 51 has the mounting surface 51a facing the +Z direction. The PCB 51 is provided with the through holes 72A, 72B, 72C, and 72D open to the mounting surface 51a. The I/F connector 53 includes the base 120 and the reinforcing protrusions 103A, 103B, 103C, and 103D. The base 120 is placed on the mounting surface 51a of the PCB 51 or placed apart from the mounting surface 51a in the +Z direction. The reinforcing protrusions 103A, 103B, 103C, and 103D protrude from the base 120. In the Z direction orthogonal to the mounting surface 51a, the end surface 111 of the reinforcing protrusion 103A is more apart from the mounting surface 51a than the end surfaces 111 of the reinforcing protrusions 103B, 103C, and 103D in the −Z direction. The reinforcing protrusions 103A, 103B, 103C, and 103D have the tapered surfaces 113. The tapered surfaces 113 of the reinforcing protrusions 103A, 103B, 103C, and 103D extend obliquely from the end surfaces 111 with respect to the +Z direction. Because of this, in mounting the I/F connector 53 on the PCB 51, the reinforcing protrusion 103A is inserted into the through hole 72A before the reinforcing protrusions 103B, 103C, and 103D are inserted into the through holes 72B, 72C, and 72D. In a direction (for example, the Y direction) orthogonal to the +Z direction, the center of the reinforcing protrusion 103A may not align with the center of the through hole 72A. In such a case, the tapered surface 113 of the reinforcing protrusion 103A abuts on the edge of the through hole 72A to guide the reinforcing protrusion 103A to the through hole 72A to be able to correct the position of the I/F connector 53 with respect to the PCB 51. In the Y direction orthogonal to the +Z direction the tapered surface 113 of the reinforcing protrusion 103A is longer in length than each of the tapered surfaces 113 of the reinforcing protrusions 103B, 103C, and 103D. This allows the tapered surface 113 of the reinforcing protrusion 103A to abut on the edge of the through hole 72A irrespective of large central misalignment between the reinforcing protrusion 103A and the through hole 72A beyond the length of the tapered surfaces 113 of the reinforcing protrusions 103B, 103C, and 103D in the Y direction. Thus, in the HDD 10 according to the present embodiment, the reinforcing protrusion 103A can correct the position of the I/F connector 53 with respect to the PCB 51, which can ensure that the reinforcing protrusions 103A, 103B, 103C, and 103D are inserted into the through holes 72A, 72B, 72C, and 72D. In the case of a failure in inserting the reinforcing protrusions 103A, 103B, 103C, and 103D into the through holes 72A, 72B, 72C, and 72D, for example, the base 120 may be placed away from the mounting surface 51a, which may cause difficulty in mounting the I/F connector 53 on the PCB 51. However, the HDD 10 according to the present embodiment can ensure the mounting of the I/F connector 53 on the PCB 51. Further, the HDD 10 does not require the elongation of the reinforcing protrusions 103B, 103C, and 103D in the Z direction and the tapered surfaces 113 thereof in the Y direction. Thus, the HDD 10 allows a decrease in the lengths of the reinforcing protrusions 103B, 103C, and 103D, leading to avoiding the reinforcing protrusions 103B, 103C, and 103D, protruding from the PCB 51 through the through holes 72B, 72C, and 72D, from interfering with the other components.

The I/F connector 53 includes the two attachment plates 84. The two attachment plates 84 each have the reinforcing protrusions 103A, 103B, 103C, and 103D, and are apart from each other in the X direction orthogonal to the Y direction and the +Z direction. In each of the two attachment plates 84, the reinforcing protrusions 103A and 103C are apart from each other in the X direction. For example, in mounting the I/F connector 53 on the PCB 51 by the automatic mounter 150, the I/F connector may be placed in a different posture from an intended posture about the rotation axis Ax in FIG. 7 orthogonal to the mounting surface 51a. In this case, the more outer part of the I/F connector 53 is more displaced from an intended position in the X direction. In the present embodiment, the reinforcing protrusion 103A is located more outside than the reinforcing protrusion 103C in the I/F connector 53 in the X direction. In other words, the I/F connector 53 includes the reinforcing protrusion 103A at a position where the more outer part of the I/F connector 53 is more displaced from an intended position than the position of the reinforcing protrusion 103C. Thereby, the reinforcing protrusion 103A can more effectively correct the position of the I/F connector 53 with respect to the PCB 51 in the Y direction.

The difference in length between the through hole 72A and the reinforcing protrusion 103A is smaller in the Y direction than in the X direction. That is, the tapered surface 113 can correct the position of the I/F connector 53 with respect to the PCB 51 in the Y direction in which the dimensional margin of the reinforcing protrusion 103A with respect to the through hole 72A is smaller. Thus, the HDD 10 can ensure the insertion of the reinforcing protrusions 103A, 103B, 103C, and 103D into the through holes 72A, 72B, 72C, and 72D.

The reinforcing protrusion 103A has two tapered surfaces 113 that are apart from each other in the Y direction and extend toward the end surface 111 to approach each other. The end surface 111 extends along the mounting surface 51a between the two tapered surfaces 113. That is, the reinforcing protrusion 103A is tapered from both sides toward the substantially flat end surface 111. Thus, the tapered surface 113 can correct the position of the I/F connector 53 with respect to the PCB 51 in the Y direction regardless of whether the I/F connector 53 is placed away from the PCB 51 in the +Y direction or the −Y direction. In addition, the HDD 10 can lower the possibility that the tip (end surface 111) of the reinforcing protrusion 103A damages the PCB 51, as compared with the reinforcing protrusion 103A having a sharper tip pointing to the mounting surface 51a.

The PCB 51 includes the electrodes 65 on the mounting surface 51a. The PCB 51 is provided with the positioning hole 131 open to the mounting surface 51a. The base 120 includes the lower surface 93a facing the mounting surface 51a. The I/F connector 53 includes the mounting terminals 83 and the positioning pins 85. The mounting terminals 83 extend from the base 120 and are joined to the electrodes 65. The positioning pin 85 protrudes from the lower surface 93a and is at least partially accommodated in the positioning hole 131. The I/F connector 53 further includes the different-colored portion 141. The different-colored portion 141 is located at the end of the positioning pin 85 in the −Z direction. The different-colored portion 141 is different in color from the lower surface 93 as and thus easily recognizable through image recognition. That is, by the different-colored portion 141, the position of the positioning pin 85 is easily recognizable through image recognition. As a result, the HDD 10 allows accurate alignment of the positioning pin 85 with the positioning hole 131, and accurate alignment of the reinforcing protrusions 103A, 103B, 103C, and 103D with respect to the through holes 72A, 72B, 72C, and 72D. That is, the HDD 10 implements accurate placement of the I/F connector 53 at an intended position on the PCB 51. Consequently, the HDD 10 can prevent the reinforcing protrusions 103A, 103B, 103C, and 103D from being misaligned with the through holes 72A, 72B, 72C, and 72D. Further, the HDD 10 can implement decrease in the size of the positioning holes 131 and 132.

Further, the HDD 10 of the present embodiment can ensure the insertion of the positioning pin 85 into the positioning hole 131. In the case of a failure in inserting the positioning pin 85 into the positioning hole 131, for example, the base 120 may be placed away from the mounting surface 51a, which may cause difficulty in mounting the I/F connector 53 on the PCB 51. However, the HDD 10 according to the present embodiment can ensure that the I/F connector 53 is properly mounted on the PCB 51.

In the first embodiment described above, the reinforcing protrusion 103A is longer in length than the reinforcing protrusions 103B, 103C, and 103D. However, one of the attachment plates 84 may be provided with the reinforcing protrusion 103A of a longer length while the other attachment plate 84 may be provided with the reinforcing protrusion 103B of a longer length, for example. In this case, the HDD 10 can include the two attachment plates 84 of the same shape.

Second Embodiment

Hereinafter, a second embodiment will be described with reference to FIG. 9. In the following description of the plurality of embodiments, components having the same functions as those of the components already described are denoted by the same reference numerals as those of the components already described, and the description thereof may be omitted. The plurality of components denoted by the same reference numerals do not necessarily have all the functions and properties in common, and may have different functions and properties according to each embodiment.

Figure 9:
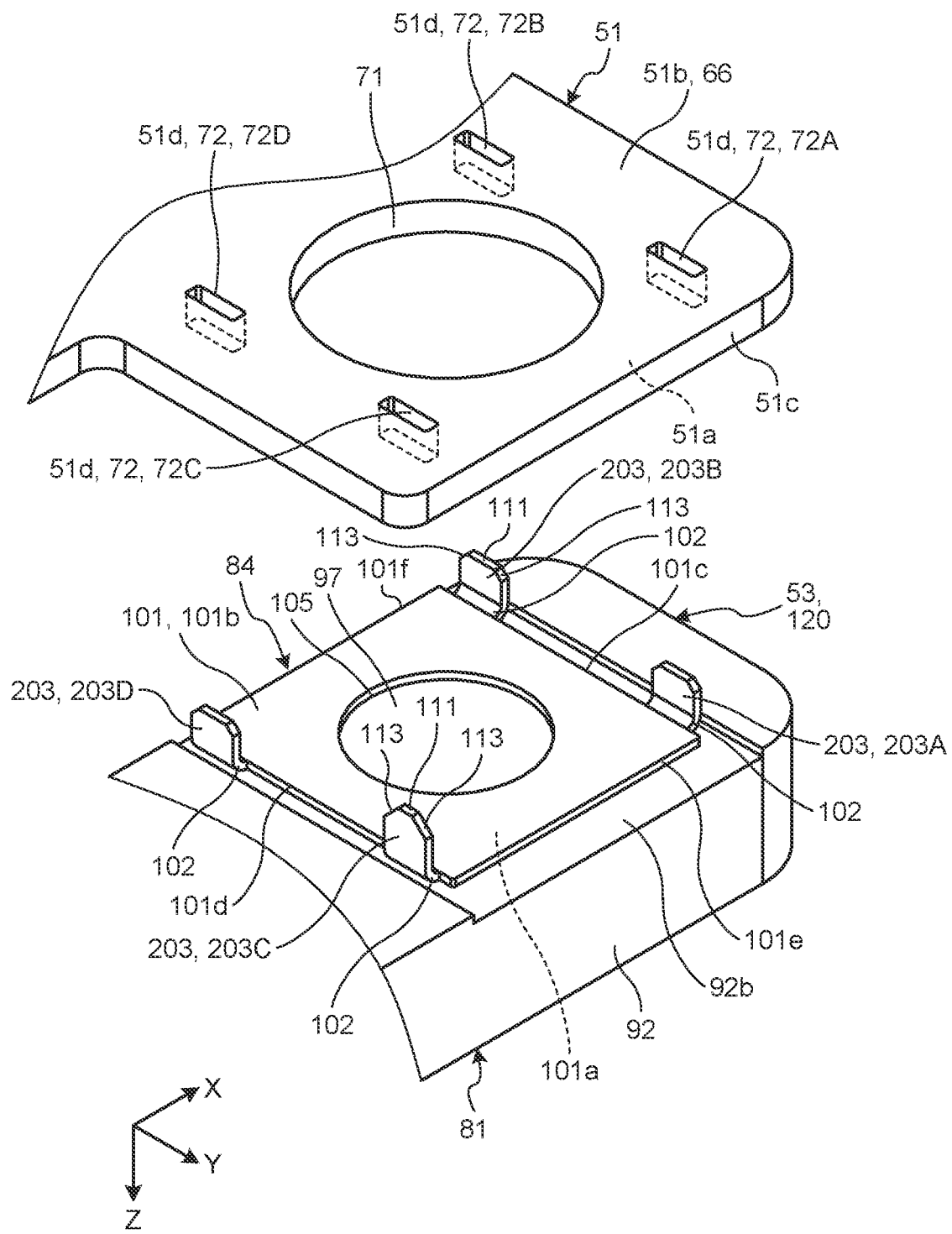
FIG. 9 is an exemplary perspective view illustrating a part of an I/F connector and an attachment region according to a second embodiment.

FIG. 9 is an exemplary perspective view illustrating a part of the I/F connector 53 and the attachment region 66 according to the second embodiment. As shown in FIG. 9, in the second embodiment, each of the two attachment plates 84 includes four reinforcing protrusions 203 (203A, 203B, 203C, 203D) instead of the reinforcing protrusions 103 (103A, 103B, 103C, 103D). The reinforcing protrusions 203 (203A, 203B, 203C, 203D) are substantially equal to the reinforcing protrusions (103A, 103B, 103C, 103D) of the first embodiment except for the following points.

The shapes of the reinforcing protrusions 203A, 203B, and 203D are substantially the same or substantially mirror-symmetrical. The shape of the reinforcing protrusion 203C is different from the shapes of the reinforcing protrusions 203A, 203B, and 203D.

The shape of the reinforcing protrusion 203A in the second embodiment is, for example, substantially the same as or substantially mirror-symmetrical with the shape of the reinforcing protrusion 103B in the first embodiment. The shape of the reinforcing protrusion 203C in the second embodiment is, for example, substantially the same as or substantially mirror-symmetrical with the shape of the reinforcing protrusion 103A in the first embodiment.

In the second embodiment, the length of the reinforcing protrusion 203C in the Z direction is longer than each length of the reinforcing protrusions 203A, 203B, and 203D in the Z direction. Thus, in the Z direction, the end surface 111 of the reinforcing protrusion 203C is separated in the −Z direction from the mounting surface 51a and the end of the base 120 in the −Z direction more than each end surface 111 of the reinforcing protrusions 203A, 203B, and 203D.

Further, in the second embodiment, the length of each tapered surface 113 of the reinforcing protrusion 203C in the Y direction is longer than the length of each tapered surface 113 of the reinforcing protrusions 203A, 203B, and 203D in the Y direction. The length of the end surface 111 of the reinforcing protrusion 203C in the Y direction is shorter than the length of each end surface 111 of the reinforcing protrusions 203A, 203B, and 203D in the Y direction.

As described above, in the second embodiment, the reinforcing protrusion 203C is an example of the first protrusion, and the reinforcing protrusions 203A, 203B, and 203D are examples of the second protrusion. The reinforcing protrusion 203C is located inside the I/F connector 53 in the X direction with respect to the reinforcing protrusions 203A and 203B.

In the HDD 10 according to the second embodiment described above, the tapered surfaces 113 of the reinforcing protrusion 203C abut on the edge of the through hole 72C to guide the reinforcing protrusion 203C to the through hole 72C to be able to correct the position of the I/F connector 53 with respect to the PCB 51 in the Y direction. The reinforcing protrusion 203C is located more inside than the reinforcing protrusion 203A in the I/F connector 53 in the X direction. As a result, the reinforcing protrusion 203C can correct the position of the I/F connector 53 around the rotation axis Ax with respect to the PCB 51 in a larger range, as compared with the reinforcing protrusion 203C located more outside than the reinforcing protrusion 203A in the I/F connector 53 in the X direction. As such, the reinforcing protrusion 203C can more effectively correct the position of the I/F connector 53 with respect to the PCB 51 in the Y direction.

Third Embodiment

Figure 10:
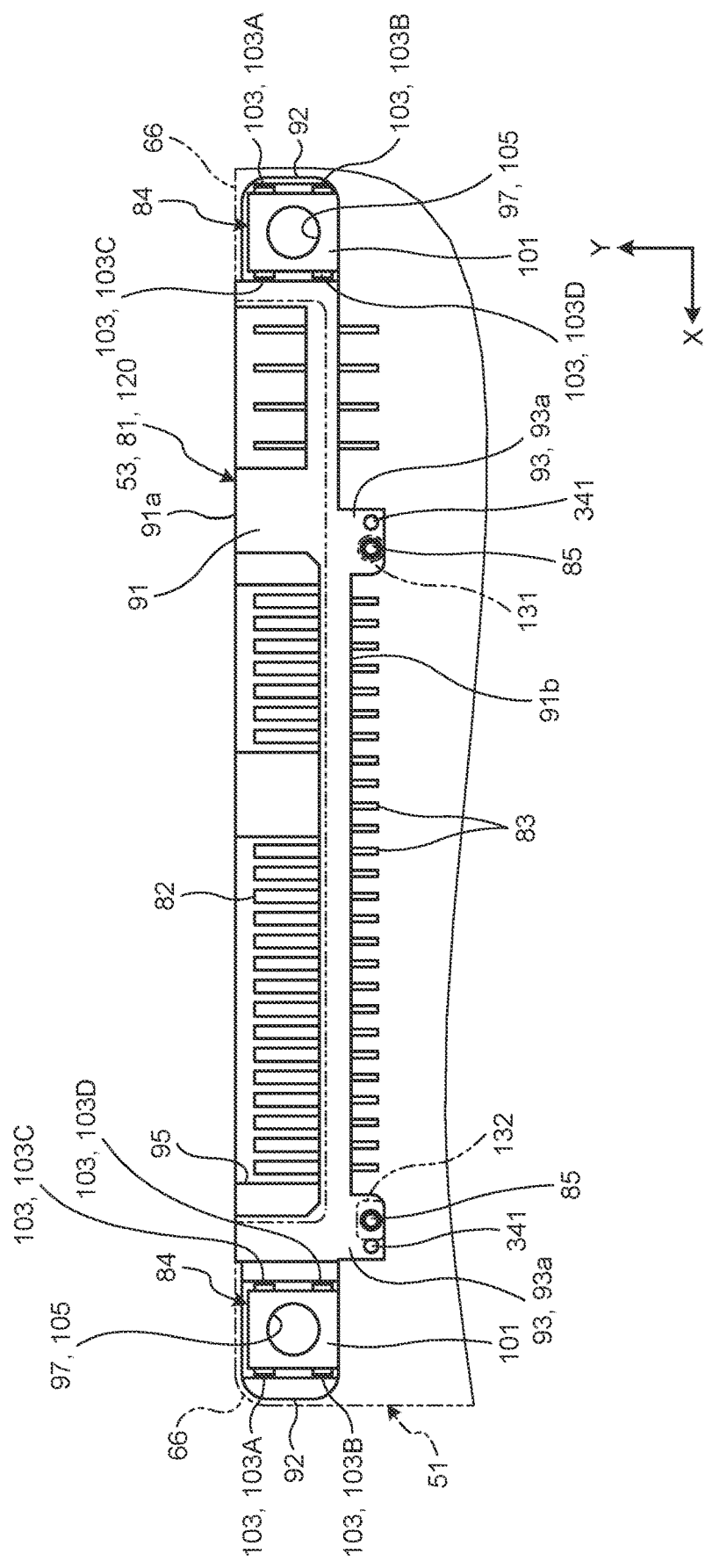
FIG. 10 is an exemplary bottom view illustrating an I/F connector according to a third embodiment.

Hereinafter, a third embodiment will be described with reference to FIG. 10. FIG. 10 is an exemplary bottom view illustrating the I/F connector 53 according to the third embodiment. As illustrated in FIG. 10, in the third embodiment, the I/F connector 53 includes two different-colored portions 341 instead of the different-colored portions 141. The different-colored portions 341 are an example of a second different-colored portion and the different-colored portion.

The two different-colored portions 341 are adjacent to the two corresponding positioning pins 85. One of the different-colored portions 341 is provided on the lower surface 93a of one of the positioning portions 93. The other different-colored portion 341 is provided on the lower surface 93a of the other positioning portion 93.

Each different-colored portions 341 is different in color from the other portions of the lower surface 93a. For example, the color of the different-colored portion 341 is white. The different-colored portion 341 is, for example, an ink applied to the lower surface 93a, a part of the lower surface 93a subjected to laser processing, or a part of the lower surface 93a having irregularities formed thereon. The different-colored portions 341 are not limited to this example.

The distance between each of the two different-colored portions 341 and its corresponding positioning pin 85 is shorter than the distance between the different-colored portions 341 and the mounting terminals 83. In other words, the different-colored portions 341 are closer to the positioning pins 85 than the mounting terminals 83. Further, the distance between each of the two different-colored portions 341 and the corresponding positioning pin 85 is shorter than the distance between the mounting terminals 83 and the positioning pins 85.

In the third embodiment, the control unit 153 of the automatic mounter 150 recognizes the positions of the two different-colored portions 341 in the image and calculates the positions of the two positioning pins 85. The control unit 153 sets the position of one of the different-colored portions 341 or the calculated position of one of the positioning pins 85 as the origin of the position of the I/F connector 53. The image recognition by the control unit 153 is not limited to this example.

In the HDD 10 of the third embodiment described above, the I/F connector 53 further includes the different-colored portions 341. Each different-colored portion 341 is located on the lower surface 93a, is different in color from the rest of the lower surface 93a, and is closer to the positioning pin 85 than to the mounting terminals 83. The distance between the different-colored portion 341 and the positioning pin 85 is shorter than the distance between the mounting terminal 83 and the positioning pin 85. The different-colored portion 341 is different in color from the rest of the lower surface 93a, and thus easily recognizable through image recognition. That is, the presence of the different-colored portion 341 in the vicinity of the positioning pin 85 can facilitate the recognition of the position of the positioning pin 85 through image recognition. As a result, in the HDD 10, aligning the positioning pin 85 with respect to the positioning hole 131 makes it easier to align the reinforcing protrusions 103A, 103B, 103C, and 103D with the through holes 72A, 72B, 72C, and 72D, allowing the I/F connector 53 to be disposed at an intended position on the PCB 51. Thus, in the HDD 10, it is possible to prevent the reinforcing protrusions 103A, 103B, 103C, and 103D from being misaligned with the through holes 72A, 72B, 72C, and 72D.

It is easier to form the different-colored portion 341 on the lower surface 93a than at the end of the positioning pin 85 in the −Z direction. Thus, in the HDD 10 of the present embodiment a distinctive different-colored portion 341 can be provided on the lower surface 93a as compared with at the end of the positioning pin 85 in the −Z direction. Thus, the image recognition based on the different-colored portion 341 can be facilitated.

In the image recognition, the origin of the position of the I/F connector 53 may be set based on the position of the mounting terminal 83. In this case, however, the distance between the mounting terminal 83 and the positioning pin 85 becomes relatively elongated. In the present embodiment, the position of the positioning pin 85 can be recognized through image recognition due to the different-colored portion 341 being in the vicinity of the positioning pin 85. Thereby, the HDD 10 according to the present embodiment enables accurate positional adjustment of the positioning pin 85.

Fourth Embodiment

Figure 11:
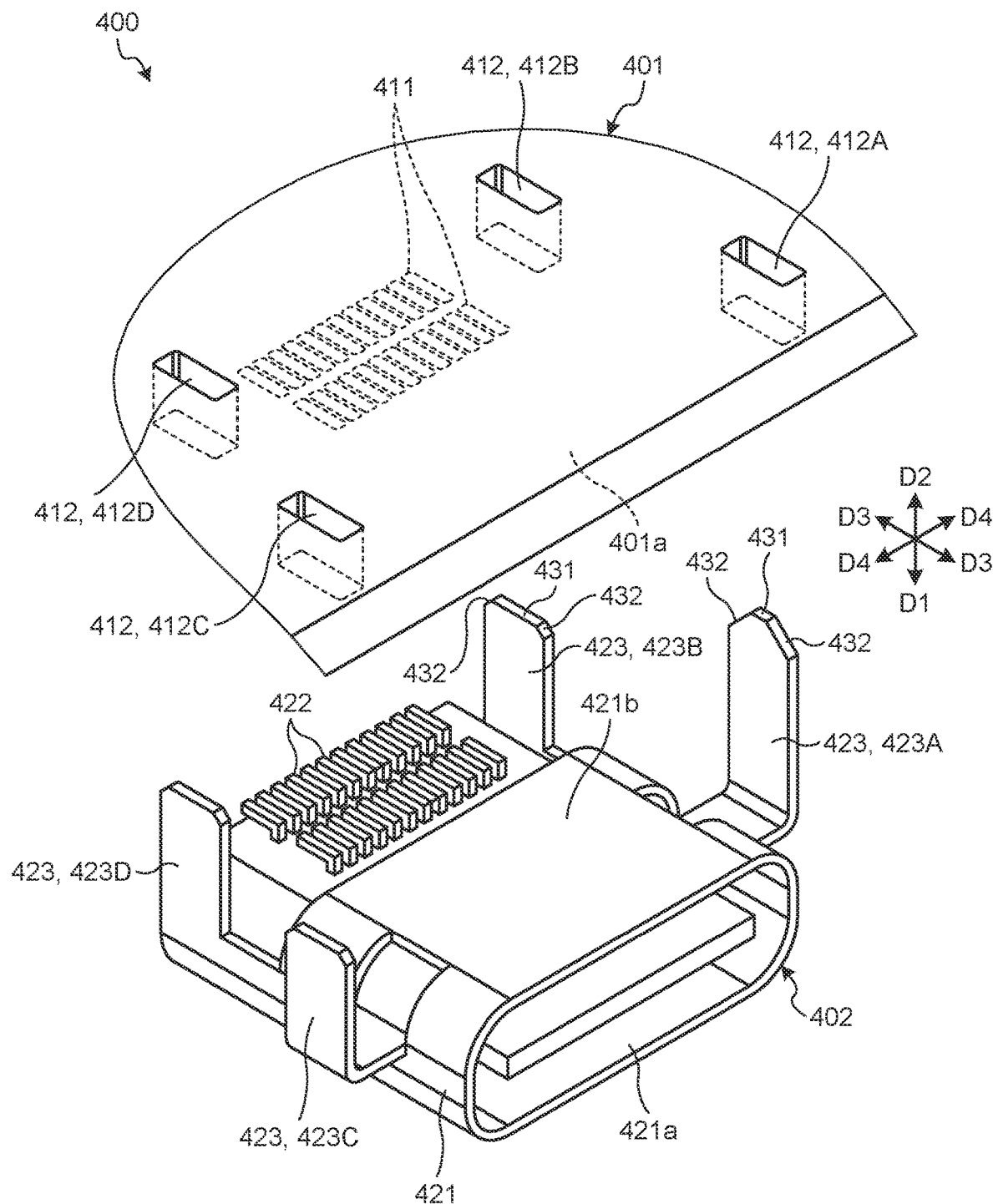
FIG. 11 is an exemplary perspective view illustrating a part of a substrate of an electronic device and an electronic component 402 according to a fourth embodiment.

Hereinafter, a fourth embodiment will be described with reference to FIG. 11. FIG. 11 is an exemplary perspective view illustrating a part of a substrate 401 and an electronic component 402 of an electronic device 400 according to the fourth embodiment. The electronic device 400 according to the fourth embodiment is an HDD, an SSD, a personal computer, a supercomputer, a server, a television receiver, a game machine, or another electronic device.

The electronic device 400 includes the substrate 401 and the electronic component 402. The substrate 401 is, for example, a PCB. The substrate 401 has a surface 401a facing a first direction D1. The surface 401a is an example of the first surface.

The substrate 401 further includes a plurality of electrodes 411 provided on the surface 401a. The substrate 401 is provided with four holes 412. The four holes 412 penetrate the substrate 401 and are open in the surface 401a at positions separated from each other.

The four holes 412 may be individually referred to as holes 412A, 412B, 412C, and 412D. The hole 412A is an example of the first hole. The holes 412B, 412C, and 412D are examples of the second hole.

The electronic component 402 is, for example, a connector conforming to an interface standard such as USB Type-C. The electronic component 402 may be a connector conforming to another interface standard such as HDMI (registered trademark), or may be another electronic component. The electronic component 402 is mounted on the substrate 401. The electronic component 402 includes a base 421, a plurality of terminals 422, and four protrusions 423.

The base 421 is located on the surface 401*a* or separated from the surface 401*a* in the first direction D1. The base 421 is provided with a socket 421*a* into which a plug conforming to USB Type-C can be inserted.

The plurality of terminals 422 extend from the base 421. The terminals 422 are bonded to the corresponding electrodes 411 by, for example, soldering. This causes the electronic component 402 to be mounted on the substrate 401.

The four protrusions 423 protrude from the base 421 in a second direction D2 opposite to the first direction. The four protrusions 423 may be individually referred to as protrusions 423A, 423B, 423C, and 423D. The protrusion 423A is an example of the first protrusion. The protrusions 423B, 423C, and 423D are examples of the second protrusion.

The four protrusions 423 is inserted into the four corresponding holes 412. The protrusion 423A is at least partially accommodated in the hole 412A. The protrusion 423B is at least partially accommodated in the hole 412B. The protrusion 423C is at least partially accommodated in the hole 412C. The protrusion 423D is at least partially accommodated in the hole 412D.

Each of the four protrusions 423 has an end surface 431 and two tapered surfaces 432. The end surface 431 of the protrusion 423A is an example of the first end and an end surface. Each tapered surface 432 of the protrusion 423A is an example of the first inclined surface and a tapered surface. Each end surface 431 of the protrusions 423B, 423C, and 423D is an example of the second end. Each tapered surface 432 of the protrusions 423B, 423C, and 423D is an example of the second inclined surface.

The end surface 431 is provided at the end of the protrusion 423 in the second direction D2. The two tapered surfaces 432 are separated from each other in a third direction D3. The third direction D3 is a direction orthogonal to the first direction D1 and the second direction D2.

Each of the two tapered surfaces 432 extends obliquely from the end surface 431 with respect to the first direction D1 and the second direction D2 such that the width of the protrusion 423 in the third direction D3 is tapered toward the end surface 431. In other words, the two tapered surfaces 432 extend toward the end surface 431 to approach each other. The end surface 431 extends in the third direction D3 along the surface 401*a* between the two tapered surfaces 432.

The shapes of the protrusions 423B, 423C, and 423D are substantially the same or substantially mirror-symmetrical. The shape of the protrusion 423A is different from the shapes of the protrusions 423B, 423C, and 423D as follows.

In the Z direction, the length of the protrusion 423A is longer than each length of the protrusions 423B, 423C, and 423D. Thus, in the direction orthogonal to the surface 401*a*, the end surface 431 of the protrusion 423A is separated from the surface 401*a* in the second direction D2 more than each end surface 431 of the protrusions 423B, 423C, and 423D. The Z direction is an example of the direction orthogonal to the first plane.

Further, in the direction orthogonal to the surface 401*a*, the end surface 431 of the protrusion 423A is separated in the second direction D2 from an end 421*b* of the base 421 in the second direction D2 more than each end surface 431 of the protrusions 423B, 423C, and 423D. The length of each tapered surface 432 of the protrusion 423A in the third direction D3 is longer than the length of each tapered surface 432 of the protrusions 423B, 423C, and 423D in the third direction D3.

The difference between the length of the hole 412 in the third direction D3 and the length of the protrusion 423 in the third direction D3 is smaller than the difference between the length of the hole 412 in a fourth direction D4 and the length of the protrusion 423 in the fourth direction D4. The fourth direction D4 is a direction orthogonal to the first direction D1 and the third direction D3.

In the electronic device 400 according to the fourth embodiment described above as well, in mounting the electronic component 402 on the substrate 401, the protrusion 423A is inserted into the hole 412A before the protrusions 423B, 423C, 423D are inserted into the holes 412B, 412C, 412D. There may be a situation that the center of the protrusion 423A is offset from the center of the hole 412A in the third direction D3. In such a case, the tapered surfaces 432 of the protrusion 423A abut on the edge of the hole 412A to guide the protrusion 423A to the hole 412A to be able to correct the position of the electronic component 402 with respect to the substrate 401 in the third direction D3. Further, the center of the protrusion 423A may be offset from the center of the hole 412A more greatly than the length of the tapered surfaces 432 of the protrusions 423B, 423C, and 423D in the third direction D3. Even in such a case the tapered surfaces 432 of the protrusion 423A can abut on the edge of the hole 412A. Thus, in the electronic device 400 according to the present embodiment, the protrusion 423A can correct the position of the electronic component 402 with respect to the substrate 401 so that the protrusions 423A, 423B, 423C, and 423D can be surely inserted into the holes 412A, 412B, 412C, and 412D, further ensuring the mounting of the electronic component 402 on the substrate 401.

In the plurality of embodiments described above, the reinforcing protrusions 103 and 203 and the protrusion 423 have a plate shape. Alternatively, the first protrusion and the second protrusion may have a substantially columnar or conical shape. In two or more directions the widths of the first protrusion and the second protrusion may be tapered toward their tips.

The plurality of embodiments above has described the protrusions such as the reinforcing protrusions 103 and 203 and the protrusion 423 that reinforce the connections of an electronic component, as examples of the first protrusion and the second protrusion. Alternatively, the first protrusion and the second protrusion may be terminals of an electronic component.

According to at least one of the embodiments described above, the electronic device includes a substrate and an electronic component. The substrate has a first hole, a second hole, and a first surface facing a first direction and to which the first hole and the second hole are open apart from each other. The electronic component includes a base placed on the first surface or placed apart from the first surface in the first direction, a first protrusion protruding from the base and at least partially accommodated in the first hole, and a second protrusion protruding from the base and at least partially accommodated in the second hole. The electronic component is mounted on the substrate. In a direction orthogonal to the first surface, a first end of the first protrusion is more apart from the first surface than a second end of the second protrusion in a second direction opposite to the first direction. The first end is an end of the first protrusion in the second direction. The second end is an end of the second protrusion in the second direction. The first protrusion has a first inclined surface extending obliquely from the first end with respect to the first direction. The second protrusion has a second inclined surface extending obliquely from the second end with respect to the first direction. In a third direction orthogonal to the first direction the first inclined surface is longer in length than the second inclined surface. Thereby, it is possible to ensure the mounting of the electronic component on the substrate.

In the above description, "prevent" is defined as, for example, preventing the occurrence of an event, an action, or an influence, or reducing the degree of the event, the action, or the influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a substrate with a first hole and a second hole, including
        a first surface facing a first direction and to which the first hole and the second hole are open apart from each other; and
    an electronic component mounted on the substrate, the electronic component including
        a base placed on the first surface or placed apart from the first surface in the first direction,
        a first protrusion protruding from the base, being at least partially accommodated in the first hole, and having a first end being an end of the first protrusion in a second direction opposite to the first direction, and
        a second protrusion protruding from the base, being at least partially accommodated in the second hole, and having a second end being an end of the second protrusion in the second direction, wherein
    in a direction orthogonal to the first surface, the first end of the first protrusion is more apart from the first surface than the second end of the second protrusion,
    the first protrusion has a first inclined surface extending obliquely from the first end with respect to the first direction,
    the second protrusion has a second inclined surface extending obliquely from the second end with respect to the first direction, and
    in a third direction orthogonal to the first direction the first inclined surface is longer in length than the second inclined surface.

2. The electronic device according to claim 1, wherein
    the electronic component includes two attachments each having the first protrusion and the second protrusion, the two attachments being apart from each other in a fourth direction orthogonal to the first direction and the third direction,
    in each of the two attachments, the first protrusion and the second protrusion are apart from each other in the fourth direction, and
    the first protrusion is located more outside the electronic component than the second protrusion in the fourth direction.

3. The electronic device according to claim 1, wherein
    the electronic component includes two attachments each having the first protrusion and the second protrusion, the two attachments being apart from each other in a fourth direction intersecting the first direction and the third direction,
    in each of the two attachments, the first protrusion and the second protrusion are located apart from each other in the fourth direction, and
    the first protrusion is located more inside than the second protrusion in the electronic component in the fourth direction.

4. The electronic device according to claim 2, wherein
    a difference in length between the first hole and the first protrusion in the third direction is smaller than a difference in length between the first hole and the first protrusion in the fourth direction.

5. The electronic device according to claim 1, wherein
    the first inclined surface has two tapered surfaces apart from each other in the third direction, the two tapered surfaces extending toward the first end to approach each other, and
    the first end has an end surface extending along the first surface between the two tapered surfaces.

6. The electronic device according to claim 1, wherein
    the substrate with a third hole opening to the first surface includes an electrode on the first surface,
    the base has a second surface facing the first surface,
    the electronic component includes
        a terminal extending from the base and joined to the electrode, and
        a third protrusion protruding from the second surface and being at least partially accommodated in the third hole, and
        a first different-colored portion at an end of the third protrusion in the second direction or a second different-colored portion on the second surface,
    the first different-colored portion being different in color from the second surface,
    the second different-colored portion being different in color from a rest of the second surface, closer to the third protrusion than to the terminal, and in a shorter distance from the third protrusion than the terminal.

7. The electronic device according to claim 1, wherein
    the electronic component is an interface connector conforming to serial attached SCSI, serial ATA, or NVM express.

8. An electronic component comprising:
    a base;
    a first protrusion protruding from the base in a fifth direction; and
    a second protrusion protruding from the base in the fifth direction apart from the first protrusion, wherein
    in the fifth direction, a first end of the first protrusion is more apart from an end of the base than a second end of the second protrusion,
    the first protrusion has a first inclined surface extending obliquely from the first end with respect to the fifth direction,
    the second protrusion has a second inclined surface extending obliquely from the second end with respect to the fifth direction, and in a sixth direction orthogonal to the fifth direction, the first inclined surface is longer in length than the second inclined surface.

9. An electronic device comprising:
a substrate having a first surface to which a hole is open, the first surface facing a first direction;
an electronic component mounted on the substrate, the electronic component including
    a base placed on the first surface or placed apart from the first surface in the first direction,
    a second surface on the base, the second surface facing the first surface, and
    a protrusion protruding from the second surface and being at least partially accommodated in the hole,
wherein
the protrusion or the second surface includes a different-colored portion being different in color from a part of the second surface.

10. The electronic device according to claim 9, wherein
the protrusion includes the different-colored portion at an end in a second direction opposite to the first direction, the different-colored portion being different in color from the second surface.

11. The electronic device according to claim 9, wherein
the substrate includes an electrode on the first surface,
the electronic component is a connector and includes a terminal extending from the base and joined to the electrode,
the second surface includes the different-colored portion different in color from a rest of the second surface, and
the different-colored portion and the protrusion are in a shorter distance than the different-colored portion and the terminal and than the terminal and the protrusion.

\* \* \* \* \*